(12) United States Patent
Sharma et al.

(10) Patent No.: US 11,681,036 B2
(45) Date of Patent: Jun. 20, 2023

(54) IMAGE PROCESSING APPARATUS, IMAGE PROCESSING METHOD, AND NON-TRANSITORY COMPUTER READABLE MEDIUM STORING IMAGE PROCESSING PROGRAM

(71) Applicant: NEC CORPORATION, Tokyo (JP)

(72) Inventors: Shreya Sharma, Tokyo (JP); Yuzo Senda, Tokyo (JP); Hirofumi Aoki, Tokyo (JP); Kenta Senzaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 206 days.

(21) Appl. No.: 16/958,339

(22) PCT Filed: Dec. 28, 2017

(86) PCT No.: PCT/JP2017/047272
§ 371 (c)(1),
(2) Date: Jun. 26, 2020

(87) PCT Pub. No.: WO2019/130554
PCT Pub. Date: Jul. 4, 2019

(65) Prior Publication Data
US 2021/0063565 A1   Mar. 4, 2021

(51) Int. Cl.
*G01S 13/90* (2006.01)
*G01S 7/40* (2006.01)
*G01S 7/41* (2006.01)
*G06N 20/10* (2019.01)

(52) U.S. Cl.
CPC .......... *G01S 13/9027* (2019.05); *G01S 7/40* (2013.01); *G01S 7/417* (2013.01); *G06N 20/10* (2019.01)

(58) Field of Classification Search
CPC ........ G01S 13/9027; G01S 7/40; G01S 7/417; G06N 20/10
See application file for complete search history.

(56) References Cited

U.S. PATENT DOCUMENTS 6,259,396 B1 * 7/2001 Pham .................. G06V 10/255
342/191
2017/0350974 A1 * 12/2017 Korchev ................. G01S 7/412

FOREIGN PATENT DOCUMENTS

JP   2003-331289 A    11/2003
JP   2003331289 A  * 11/2003
JP   2007-121111 A    5/2007

OTHER PUBLICATIONS

Extended European Search Report dated Nov. 12, 2020, issued by the European Patent Office in application No. 17936574.7.
(Continued)

*Primary Examiner* — Umair Ahsan

(57) ABSTRACT

An object is to provide an image processing apparatus capable of appropriately distinguishing various object types. An image processing apparatus (1C) comprising: detector means (11) for detecting objects in an input SAR image and generating object chips; projection calculator means (12) for calculating projection information of each object using SAR geometry; feature learner means (14) for learning, for each object, a relation between an object chip and its projection information, and thereby generating learnt features of object chips; and classifier means (15) for classifying object chips into classes based on the learnt features of object chips.

13 Claims, 15 Drawing Sheets

(56) References Cited

OTHER PUBLICATIONS

Qun Zhao et al., "Synthetic aperture radar automatic target recognition with three strategies of learning and representation", Optical Engineering, May 2000, vol. 39, No. 5, pp. 1230-1244 (15 pages).
Ann Marie Bernardon et al., "A Neural System for Automatic Target Learning and Recognition Applied to Bare and Camouflaged SAR Targets", Neural Networks, 1995, vol. 8, No. 7/8, pp. 1103-1108 (6 pages).
Hossam Osman et al., "Classification of Ships in Airborne SAR Imagery Using Backpropagation Neural Networks", SPIE, Sep. 24, 1997, vol. 3161, pp. 126-136 (12 pages).
Carlos Bentes et al., "Ship Classification in TerraSAR-X Images With Convolutional Neural Networks", IEEE Journal of Oceanic Engineering, Jan. 2018, vol. 43, No. 1, pp. 258-266 (9 pages).
Mingzhe Jiang et al., "Ship Classification Based on Superstructure Scattering Features in SAR Images", IEEE Geoscience and Remote Sensing Letters, May 2016, pp. 616-620, vol. 13, No. 5.
International Search Report of PCT/JP2017/047272 dated Mar. 27, 2018 [PCT/ISA/210].
Written Opinion of PCT/JP2017/047272 dated Mar. 27, 2018 [PCT/ISA/237].

\* cited by examiner

IMAGE PROCESSING APPARATUS, IMAGE PROCESSING METHOD, AND NON-TRANSITORY COMPUTER READABLE MEDIUM STORING IMAGE PROCESSING PROGRAM

TECHNICAL FIELD

The present disclosure relates to an image processing apparatus, an image processing method, and a non-transitory computer readable medium storing an image processing program. In particular, the present disclosure relates to an image processing apparatus, an image processing method, and a non-transitory computer readable medium storing an image processing program for making object classification in an SAR (Synthetic Aperture Radar) image.

BACKGROUND ART

Automatic Target Recognition (ATR) refers to the use of computer programs and algorithms to detect and recognize target signatures using sensor data. Target recognition algorithms have numerous applications in fields such as defense where the objective is to detect and recognize an object of interest even from a noisy environment.

To deploy target recognition at a large scale, Synthetic Aperture Radar (SAR) is a promising technology. SAR is an active high resolution imaging radar which offers all weather and day-and-night monitoring of earth's surface unlike optical sensors where operating conditions are limited by atmospheric conditions. A SAR image captures both shape and scattering information of ground objects, thereby providing good representation of the objects to develop SAR-ATR systems.

In recent years, maritime traffic has increased tremendously due to high demand of global trade and sea food products. As shipping traffic grows, not only there is more likelihood of accidents and environmental damage but also illegal maritime activities such as illegal fishing and trafficking are increasing. Therefore, there is high requirement to develop an efficient and reliable maritime surveillance system to monitor and manage ocean activities around the globe. One of the solutions for maritime surveillance is to develop a ship classification or recognition system for recognizing shipping vessels and controlling suspicious activities in ocean. For this purpose, SAR technology is highly useful.

In literature, different approaches are developed to classify ships using SAR images. A general pipeline of conventional ship recognition algorithms is as follows. Firstly, a ship detection algorithm is applied to detect ship and non-ship targets in SAR image and small sub-images each containing a ship are extracted from the full SAR image. These small sub-images are called ship chips. Secondly, these ship chips are pre-processed to remove the effect of side-lobes and background noise. Thirdly, features are extracted from the pre-processed ship chips to describe various superstructures of ships. A superstructure is a part of the ship above the main deck, which consists of the forecastle, bridge and various facilities that dominates the backscattering in SAR images. For example, in an oil tanker, the oil pipeline is a superstructure and forms a strong bright line at the center. Thus, the location of center line of ship can be used as a feature to describe oil tanker. Finally, certain classification rules are defined on the extracted features to label the ship chips. Thus, ship superstructures are the most important components used for ship classification and to develop an accurate and efficient ship classification algorithm, accurate modelling of superstructures is extremely important.

A prior art for ship classification using SAR images based on ship superstructures is disclosed in NPL 1. The technology disclosed in NPL 1 uses three features to describe ship and its superstructures which are: Length (L), Stern-length-to-ship-length ratio (P), Ratio of Dimensions (ROD). ROD is a new feature proposed for describing superstructure in NPL 1. ROD is computed by taking the ratio of mean and standard deviation of pixel backscattering values of bow and middle part of ship.

The technology disclosed in NPL 1 can provide good classification only when the extracted shape and backscattering features are highly discriminative and are not sensitive to changes in SAR geometry.

CITATION LIST

Non Patent Literature

NPL 1: "Ship Classification Based on Superstructure Scattering Features in SAR Images", IEEE GEOSCIENCE AND REMOTE SENSING LETTERS, VOL. 13, NO. 5, May 2016

SUMMARY OF INVENTION

Technical Problem

However, in real world scenario, appearance of ships change with SAR geometry. Therefore, there is a possibility that the appearance of ships belonging to different classes may look similar due to the influence of SAR geometry. Therefore, the technology disclosed in NPL 1 is not sufficient to distinguish various ship types. Therefore, more discriminative features of ship and its superstructures are required to improve the classification accuracy.

The above-described problem is not limited to just ship type recognition but can also be found in general object recognition using SAR. The present disclosure has been made to solve the above-described problem and an object thereof is to provide an image processing apparatus, an image processing method, and an image processing program capable of appropriately distinguishing various objects.

Solution to Problem

In a first example aspect, an image processing apparatus comprising:

detector means for detecting objects in an input SAR image and generating object chips;

projection calculator means for calculating projection information of each object using SAR geometry;

feature learner means for learning, for each object, a relation between an object chip and its projection information, and thereby generating learnt features of object chips; and classifier means for classifying object chips into classes based on the learnt features of object chips.

In a second example aspect, an image processing method comprising:

detecting objects in an input SAR image and generating object chips;

calculating projection information of each object using SAR geometry;

learning, for each object, a relation between an object chip and its projection information, and thereby generating learnt features of object chips; and classifying object chips into classes based on the learnt features of object chips.

In a third example aspect, a non-transitory computer readable medium storing an image processing program is a non-transitory computer readable medium storing an image processing program for causing a computer to execute an image processing method, the image processing method comprising:

detecting objects in an input SAR image and generating object chips;

calculating projection information of each object using SAR geometry;

learning, for each object, a relation between an object chip and its projection information, and thereby generating learnt features of object chips; and classifying object chips into classes based on the learnt features of object chips.

Advantageous Effects of Invention

According to the present disclosure, it is possible to provide an image processing apparatus, an image processing method, and an image processing program capable of appropriately distinguishing various objects.

DESCRIPTION OF EMBODIMENTS

Embodiments according to the present disclosure are explained in detail with reference to the drawings. The same components are denoted by the same symbols throughout the drawings, and duplicated explanation is omitted as necessary for clarifying the explanation.

Figure 1:
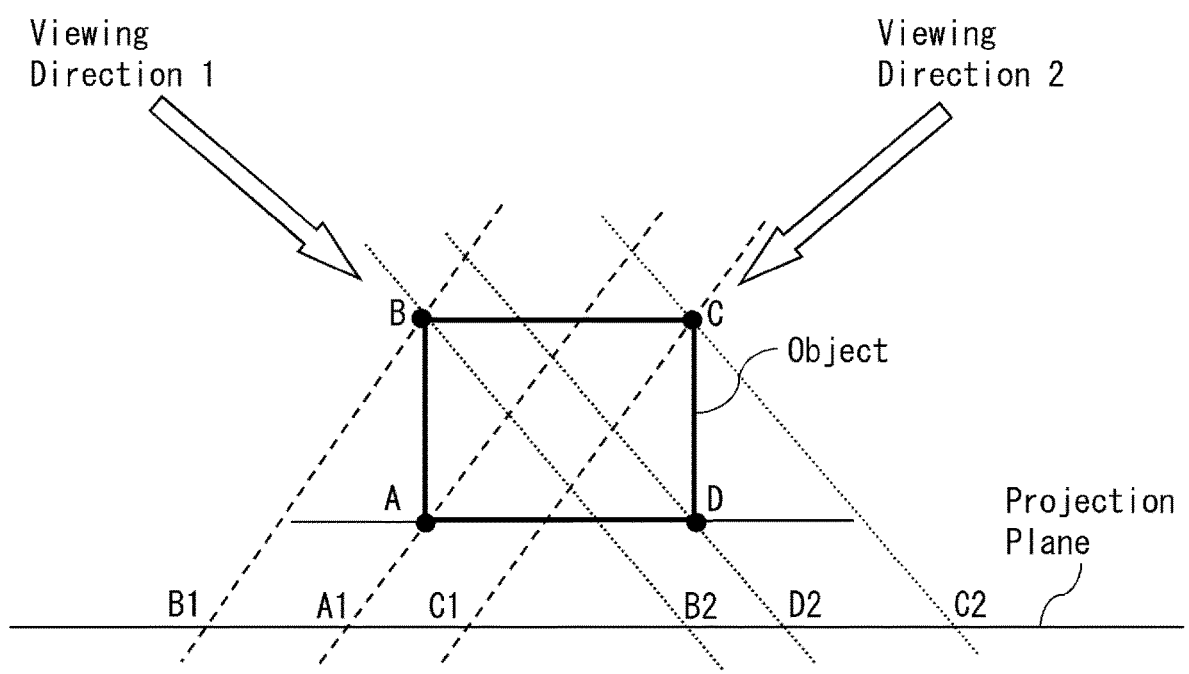
FIG. 1 shows an example of an effect of a viewing direction of a radar sensor.

Prior to explaining embodiments, an SAR geometry is explained hereinafter with reference to FIGS. 1 and 2. FIG. 1 illustrates the effect of SAR geometry on appearance of an exemplary object. In the figure, the same object is viewed from two different directions, which in real world scenario can be considered as an example of two different SAR geometries. The points A, B C and D are taken as example points on the object. When the object is viewed from direction 1, the projection of the points are A1, B1, C1 while D does not have any projection as it lies in the radar shadow and therefore, it is not sensed. Similarly, when viewed from direction 2, the projection of the points are B2, C2 and D2 while A lies in the radar shadow. The order and the number of projections of the four points are not consistent when viewing the same object from different directions. Thus, it can be concluded that viewing geometry of a radar sensor can affect the appearance of an object it is sensing.

Figure 2:
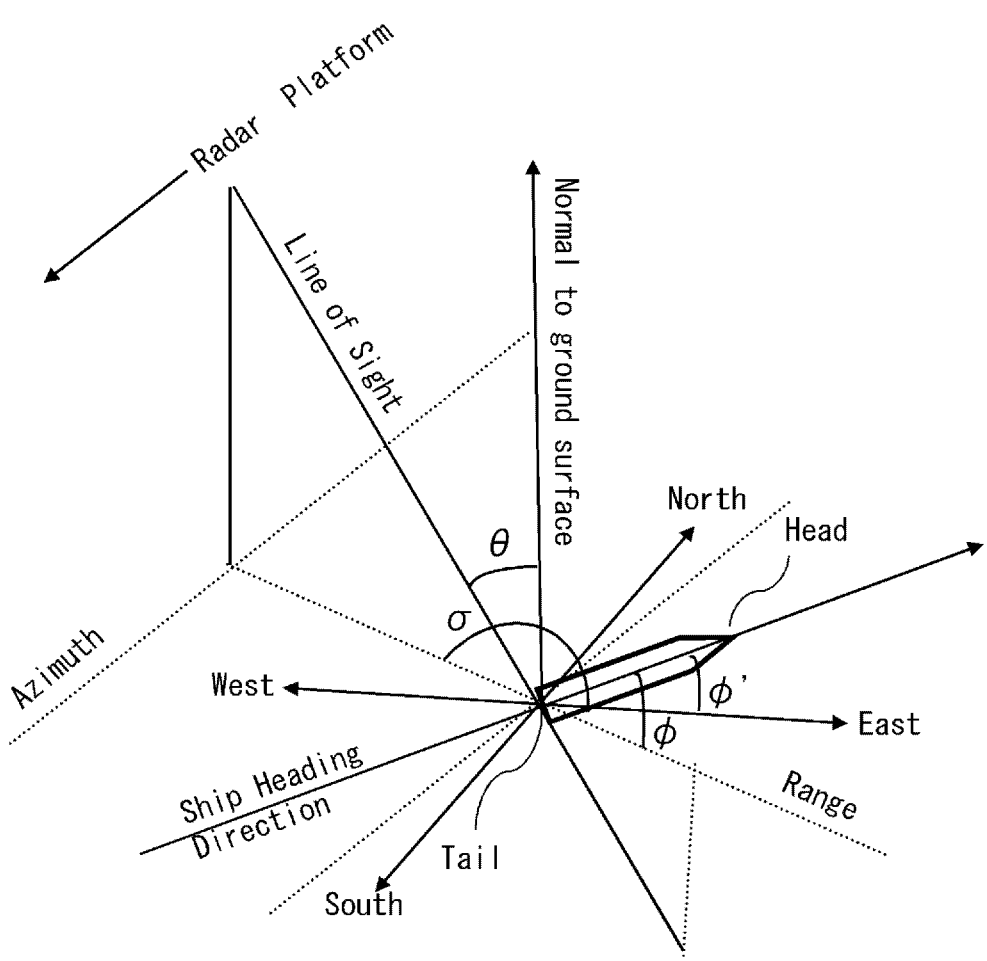
FIG. 2 shows an example of an SAR image geometry.

FIG. 2 shows an example of the SAR imaging geometry for a ship. The two angles which are important to understand imaging geometry of the ship are incident angle ($\theta$) and azimuth angle ($\varphi$). The incident angle ($\theta$) is defined as the angle between the radar line-of sight and the local vertical at the point where the radar intersects the earth or sea surface. The azimuth angle ($\varphi$) is defined as the angle between the ship heading direction and the range direction of radar wave on ground. The appearance of the ship in the SAR image changes with changes in viewing geometry as illustrated with an exemplary object in FIG. 1. Thus, SAR geometry plays a significant role in understanding electromagnetic reflection from various ship superstructures.

The above explanation is with respect to single look complex (SLC) coordinate system. When the ship image is transformed from an SLC to a geocoded image, then the SLC coordinate system of the ship changes to earth geographic coordinate system. FIG. 2 also shows the earth geographic coordinate system in 2D (2-dimension) using two orthogonal axis (east-west and north-south). To understand the ship position in earth geographic coordinate system with respect to SAR satellite position, two more angles are defined as follows. The first angle is an orientation angle ($\varphi'$) of ship which is defined as the angle between the east direction and the ship heading direction in earth geographic coordinate system. The second angle is the angle between the east direction and the range direction, measured with respect to the SLC coordinate system, towards the radar platform. This angle indicates the viewing direction of the satellite with respect to the ship position and therefore, the direction towards the satellite where all the ship points will be projected. Thus, in this patent, this angle is defined as foreshortening direction angle.

First Embodiment

Next, a configuration example of an image processing apparatus 1 according to a first embodiment is explained with reference to a block diagram shown in FIG. 3. The image processing apparatus 1 according to the first embodiment includes a detector unit 11, a projection calculator unit 12, a normalizer unit 13, a feature learner unit 14, and a classifier unit 15.

An SAR GRD (Ground Range Detected) image is input to the detector unit 11. The SAR GRD image is a geocoded image containing geographical information of all the pixels in the image. The detector unit 11 detects ship targets present in the SAR GRD image. In particular, the detector unit 11 applies ship detection algorithms to the SAR GRD image and produces two outputs.

A first output of the two outputs generated by the detector unit 11 is a set of ship images each of which includes a ship at its center. Hereinafter, these ship images are also called "ship chips". Note that, the "ship chips" are also called "ship patches". A second output of the two outputs is geographical coordinates of a pixel located at the center of each ship. Ships can be detected by using ship detection algorithms well-developed in technical literatures, such as a Constant False Alarm Rate (CFAR) and an Adaptive CFAR.

The detector unit 11 outputs each ship chip to the projection calculator unit 12 and the normalizer unit 13. Further, the detector unit 11 outputs the geographical coordinates of the central pixel of each ship to the projection calculator unit 12.

The projection calculator unit 12 is a unit that calculates projection information of each ship using SAR geometry. Note that the projection calculator unit 12 calculates 3D geometrical information as the projection information of each ship. Note that the projection calculator unit 12 may calculate relationship between a radar transmitter and each ship as the 3D geometrical information. Note that the radar transmitter is a transmitter which transmits the SAR signal.

Further, the 3D geometrical information on the relationship between the radar transmitter and each ship is, for example, information on an incident angle ($\theta$) of each ship. The incident angle ($\theta$) is important SAR geometry information that can be used to extract 3D features (3-dimensional features) of the ship from a superstructure thereof.

Figure 4:
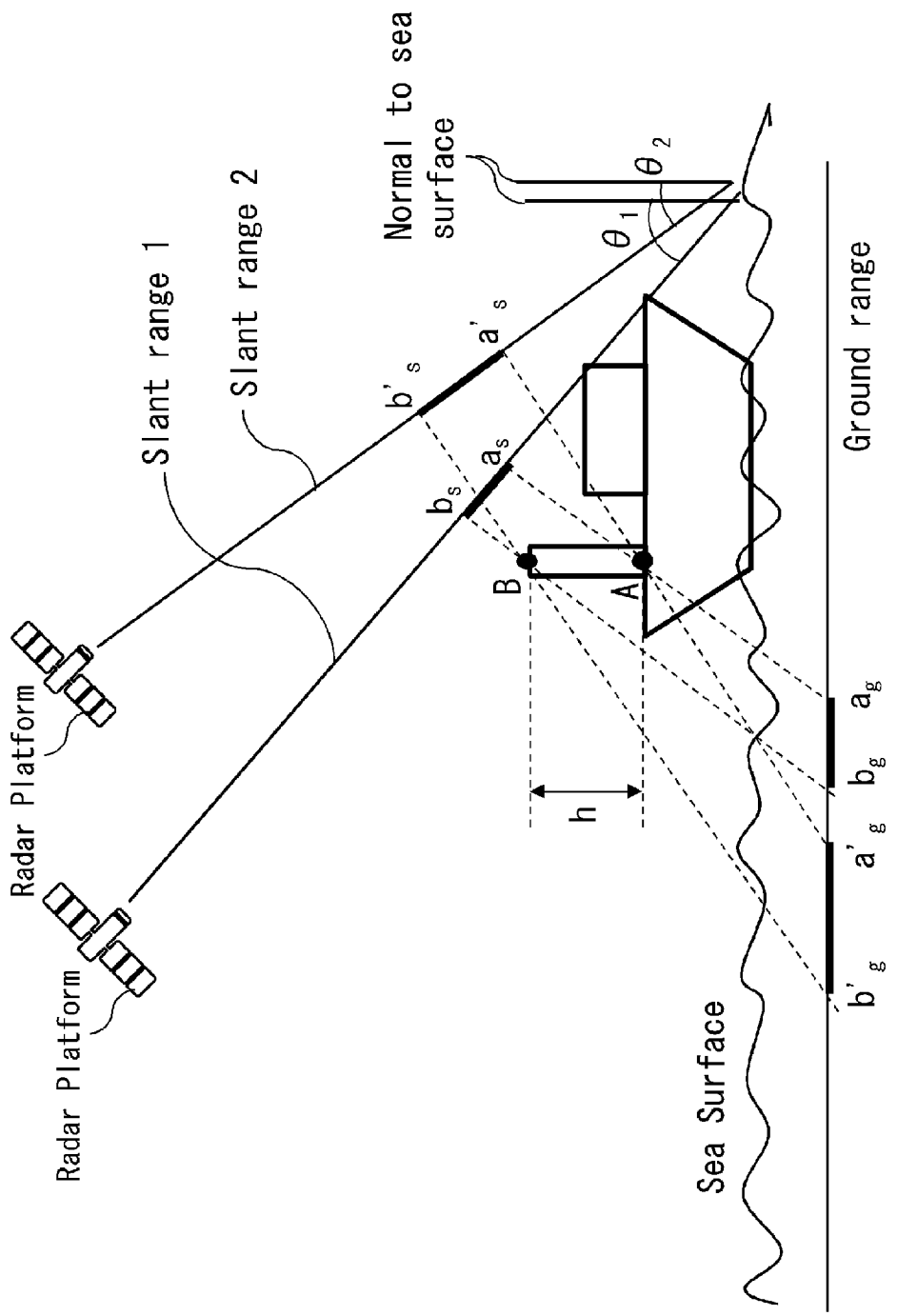
FIG. 4 shows an example of an effect of an SAR incident angle on projection of a ship.

Here, with reference to FIG. 4, it is explained that the projections of ship superstructures depend on the incident angle ($\theta$). In FIG. 4, an exemplary ship target which is imaged by a SAR sensor under two different incident angles ($\theta_1$ and $\theta_2$) is shown. In FIG. 4, in order to illustrate the influence of different incident angles, the ship target has an exemplary superstructure BA on the ship.

In the incident angle $\theta_1$, projection of BA is given by $b_s$ and $a_s$ in a slant range 1 and $b_g$ and $a_g$ in a ground range. As the incident angle changes from $\theta_1$ to $\theta_2$, projection of the same superstructure BA changes from $b_s$ and $a_s$ in the slant range 1 to $b'_s$ and $a'_s$ in a slant range 2, and from $b_g$ and $a_g$ of the ground range to $b'_g$ and $a'_g$ thereof. It can be understood that the projection makes the position B closer to the SAR sensor than the position A even though the positions A and B are actually at the same distance on the ground from the SAR sensor. Thus, the projection of a ship superstructure changes when SAR incident angle changes. The smaller the incident angle, the shorter is the projection length of the superstructure. In other words, the projection facing the radar sensor is foreshortened. Note that the direction of the foreshortened projection is a direction towards the radar platform.

Thus, the same superstructure BA shows different foreshortened projections at different incident angles. Hence, incident angle can be used as partial 3D information to understand 3D features of ship superstructures. The length of the foreshortened projection is called foreshortening length.

The foreshortening length P of the superstructure BA located at a height h at the incident angle $\theta$ can be defined as the below-shown Expression 1 by using FIG. 4.

The projection calculator unit 12 is further explained hereinafter. SAR GRD metadata is input to the projection calculator unit 12. Further, the projection calculator unit 12 calculates an incident angle and a foreshortening length corresponding to the central pixel position of each ship detected by the detector unit 11. The SAR GRD metadata include near-range and far-range incident angles information. The projection calculator unit 12 calculates the incident angle of the central pixel of the ship by using the near-range and far-range incident angles information. Note that the SAR GRD metadata may include information about an SAR image resolution, a direction of geographic north, a geographic coordinate system of the geocoded image, a spatial extent of the imaged area, and a polarization and radiometric calibration information in addition to the near-range and far-range incident angles information.

Figure 5:
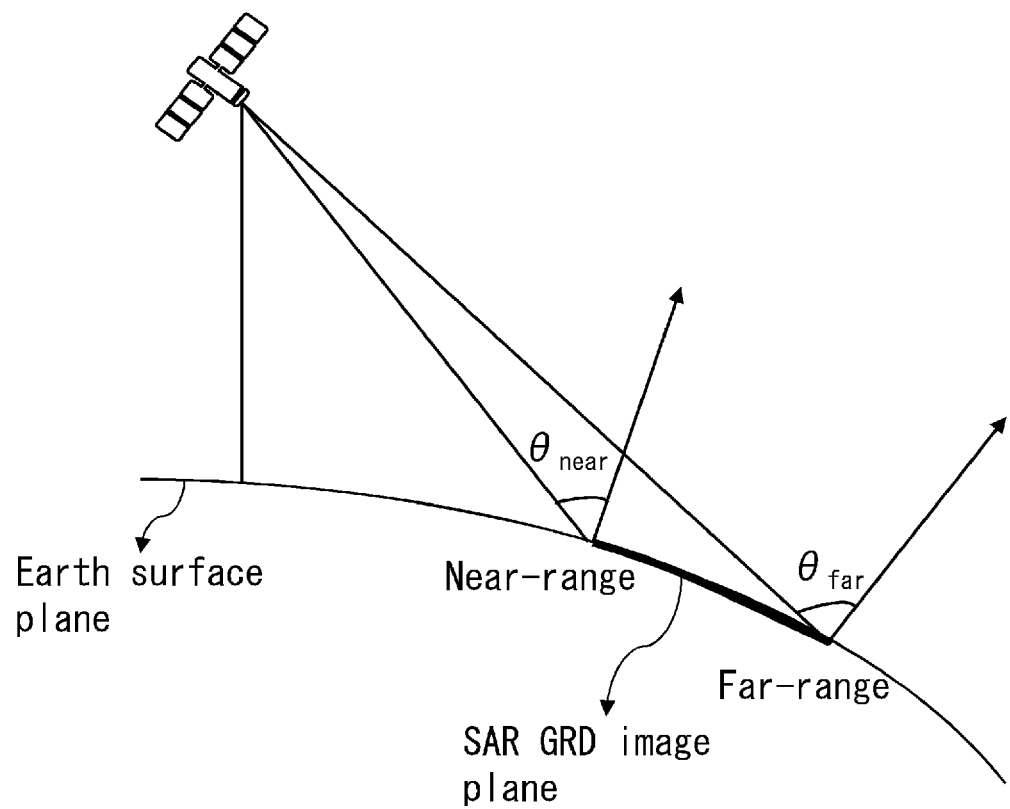
FIG. 5 is a diagram for explaining near-range and far-range incident angles with respect to an SAR satellite position.

An example of near-range and far-range incident angles for an SAR satellite (radar platform) position is explained hereinafter with reference to FIG. 5. Near-range and far-range are the extreme ranges of the SAR GRD image. The incident values for all pixels of the SAR GRD image in between the near-range and the far-range are computed by non-linear interpolation between near-range incident angle and far-range incident angle. These incident angles along with the geographical coordinates of the corresponding pixels are stored in a table.

The projection calculator unit 12 receives geographical coordinates of the central pixel of each ship chip from the detector unit 11. Further, the projection calculator unit 12 can acquire an incident angle corresponding to the geographical coordinates of the central pixel of each ship chip by referring to a table.

Central pixel is used only as an exemplary point and a pixel other than the central pixel can also be used for projection calculation. The projection calculator unit 12 can calculate projection of the central pixel of each ship by using the above-shown Expression 1. Further, the calculated projection of the central pixel of each ship is the output of the projection calculator unit 12.

However, since height information "h" of the central pixel is unknown, the projection calculator unit 12 expresses the projection information by using the incident angle $\theta$ alone. Alternatively, $\cot(\theta)$ may be the output of the projection calculator unit 12.

As explained above with reference to FIG. 2, the foreshortening direction angle $\sigma$ is an angle between east direction and range direction towards the radar platform. Since foreshortening direction angle ($\sigma$) is important to understand direction of the projections, it may be also output by the projection calculator unit 12.

Figure 6:
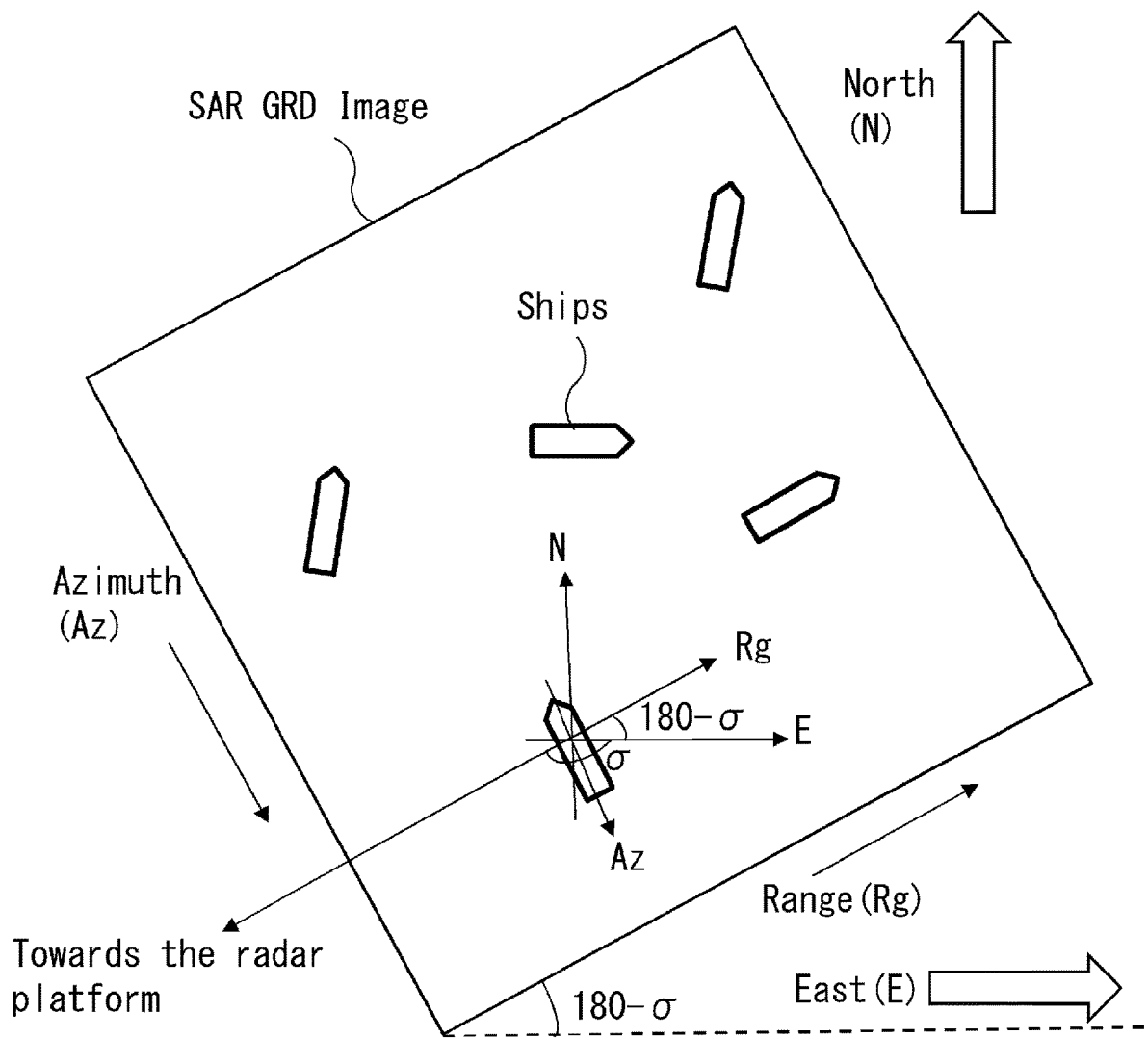
FIG. 6 shows an example of a foreshortening direction angle extraction from SAR GRD metadata.

To understand the calculation of foreshortening direction angle, FIG. 6 is given. It shows a SAR GRD image with geographic north obtained from the SAR GRD metadata, range and azimuth directions. The geographic east direction can be derived based on the geographic north. The foreshortening direction angle $\sigma$ is given by the angle (in degrees) towards the radar platform between the range direction of the SAR GRD image and the geographic east direction. FIG. 6 also shows an exemplary ship in the SAR GRD image in order to relate with the imaging geometry of ship in FIG. 2.

That is, the projection calculator unit 12 may calculate relationship between a radar receiver and each ship as the 3D geometrical information. Note that the radar receiver is a receiver which receives the SAR signal. Further, the 3D geometrical information as the relationship between the radar receiver and each ship is, for example, information on a foreshortening direction angle ($\sigma$) or incident angle of each ship.

Further, the projection calculator unit 12 may calculate both the incident angle ($\theta$) and the foreshortening direction angle ($\sigma$) of each ship. Hereinafter, an example in which the projection calculator unit 12 calculates both the incident angle ($\theta$) and the foreshortening direction angle ($\sigma$) of each ship is described.

Figure 3:
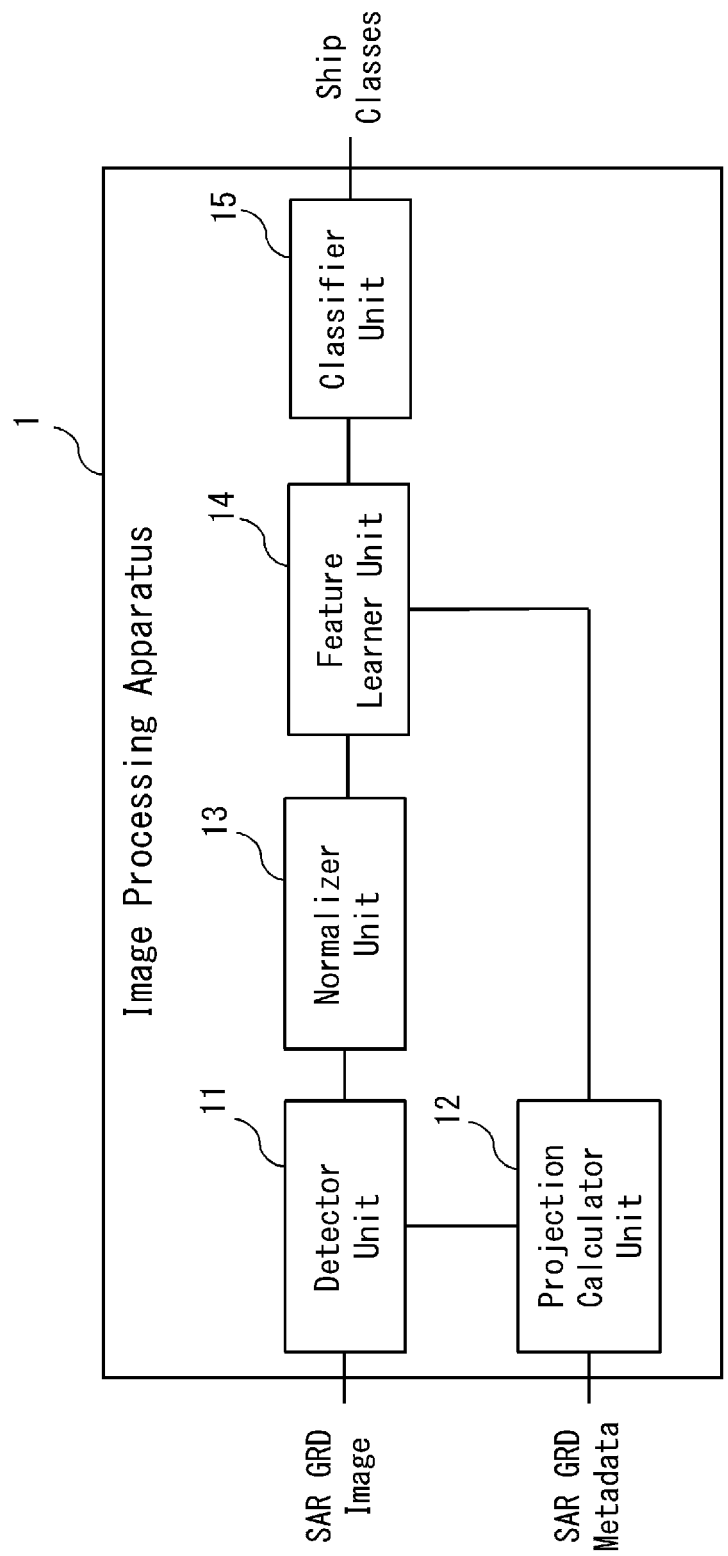
FIG. 3 is a block diagram showing a configuration example of an image processing apparatus according to a first embodiment.

The explanation is continued with reference to FIG. 3. The final output of the projection calculator unit 12 is a 2D vector [$\theta,\sigma$] for the central pixel of each ship. That is, the projection calculator unit 12 outputs the 2D vector [$\theta,\sigma$] for the central pixel of each ship to the feature learner unit 14.

Since all inputs of the feature learner unit 14 are in the range between 0 and 1, other forms which can be used as outputs of the projection calculator unit 12 are a 2D vector [$\cot(\theta)\cos(\sigma)$, $\cot(\theta)\sin(\sigma)$], a 3D vector of [$\cot(\theta)$, $\cos(\sigma)$, $\sin(\sigma)$] or other forms replacing cot( ) function with cos( ) function.

The normalizer unit 13 receives the ship chip from the detector unit 11. The normalizer unit 13 normalizes each ship chip's pixel values by their mean to make all the pixel values in the range between 0 and 1. Then, the normalizer unit 13 outputs each normalized ship chip to the feature learner unit 14. Note that in the present embodiment, normalizer unit is an optional unit and the detected ship chips can be directly input to the feature learner means 14 if the pixel values are pre-normalized in the range 0 to 1.

Note that the normalizer unit 13 may have a function of performing pre-processing such as a removal of side-lobes, an extraction of a minimum enclosing rectangle, etc. in addition to the normalizing process. Alternatively, the image processing apparatus 1 may include a unit that performs pre-processing separately form the normalizer unit 13, or may not have the function of performing pre-processing.

The feature learner unit 14 receives the projection information in the form of a 2D vector [$\theta,\sigma$] for the central pixel of each ship from the projection calculator unit 12. Further, the feature learner unit 14 receives each normalized ship chip from the normalizer unit 13.

The feature learner unit 14 learns, for each ship, a relation between the normalized ship chip and its projection information, and thereby generates learnt features of ship chips. In particular, the feature learner unit 14 learns 2D feature of ships such as areas and shapes as well as learns the relationship between the ship chips and their projections [$\theta,\sigma$] to obtain knowledge about 3D features of superstructures of the ships. Note that every ship chip can be useful as an example of a learning process. The feature learner unit 14 may be an auto-encoder capable of learning features of ships.

The learnt features of ship chips can be expressed by a multidimensional vector Z which is a combination of 2D features of the ships and 3D features thereof. The vector Z is a vector of numbers representing learnt features of the input ships by the feature learner unit 14. The feature learner unit 14 creates non-linear mappings between pixels of the ship chips and their corresponding projection information through machine learning. The number in the vector Z represent an output of the non-linear mappings.

Then, the feature learner unit 14 outputs learnt features of ship chips to the classifier unit 15.

The classifier unit 15 receives the learnt features of ship chips from the feature learner unit 14. Further, the classifier unit 15 classifies each ship chip into one of classes based on the learnt features of ship chips. Note that for the classification of ship chips into classes, well-known classification algorithms such as Support Vector Machines and Neural Networks can be used.

Next, an example of an operation performed by the image processing apparatus 1 according to the first embodiment is explained with reference to a flowchart shown in FIG. 7.

Firstly, the image processing apparatus 1 detects ships in an input SAR image and generates ship chips thereof by using the detector unit 11 (step S101).

Next, the image processing apparatus 1 calculates projection information of each ship by using the projection calculator unit 12 (step S102). Note that the projection information of each ship includes information about an incident angle ($\theta$) or foreshortening direction angle ($\sigma$) of each ship.

Next, the image processing apparatus 1 normalizes pixel values of each ship chip by using the normalizer unit 13 (step S103).

Next, the image processing apparatus 1 learns, for each ship, a relation between the normalized ship chip and its projection information, and thereby generates learnt features of ship chips by using the feature learner unit 14 (step S104).

Next, the image processing apparatus 1 classifies each ship chip into one of classes based on the learnt features of ship chips by using the classifier unit 15 (step S105).

Figure 7:
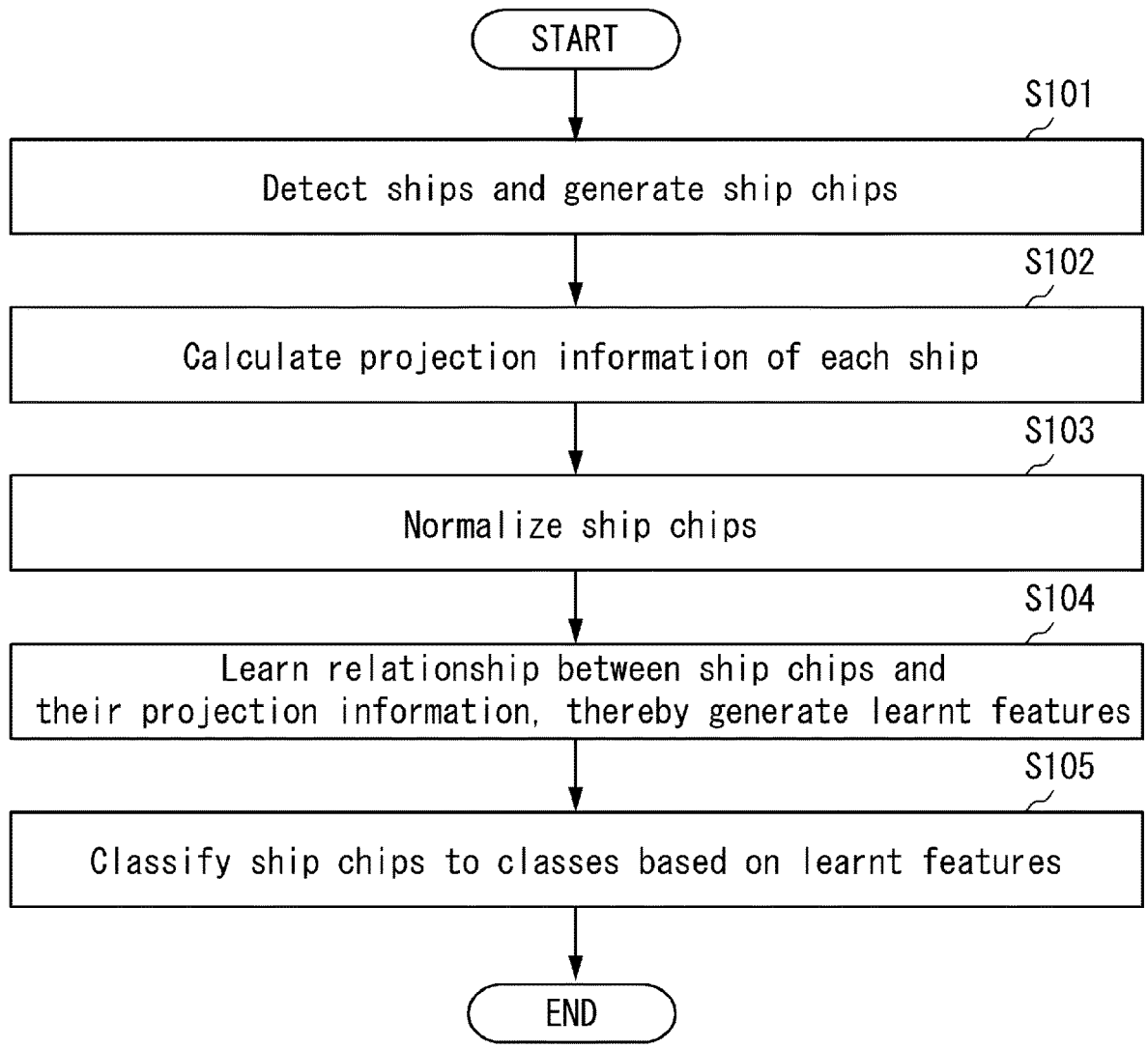
FIG. 7 is a flowchart showing an example of an operation performed by the image processing apparatus according to the first embodiment.

Note that although an example in which the process for calculating projection information of each ship in the step S102 is performed before the process for normalizing pixel values of each ship chip in the step S103 is shown in FIG. 7, the order of processes is not limited to this example. The process in the step S103 may be performed before the process in the step S102.

As described above, the image processing apparatus 1 according to the first embodiment of the present disclosure is configured so that the projection calculator unit 12 calculates 3D geometrical information as the projection information of each ship. Note that the projection calculator unit 12 may calculate at least one of relationship between a radar transmitter and each ship and relationship between a radar receiver and each ship as the 3D geometrical information. Further, the 3D geometrical information on the relationship between the radar transmitter and each ship may be information on an incident angle ($\theta$) of each ship. Further, the 3D geometrical information on the relationship between the radar receiver and each ship may be information on a foreshortening direction angle ($\sigma$) of each ship. Note that the incident angle ($\theta$) and the foreshortening direction angle ($\sigma$) are useful for recognizing a size of a superstructure and a position thereof, which are key information for ship recognition. That is, the incident angle ($\theta$) and the foreshortening direction angle ($\sigma$) can be used as partial 3D information to understand 3D features of ship superstructures. Therefore, in the image processing apparatus 1, partial 3D information can be extracted from an SAR geometry in a form of projection.

Further, the image processing apparatus 1 is configured so that the feature learner unit 14 learns, for each ship, a relation between a normalized ship chip and its projection information, and thereby generates learnt features of ship chips. In this way, in the image processing apparatus 1, it is possible to learn a relation between projection information (i.e., partial 3D information) and its corresponding ship image, and thereby to extract 3D structural information about the superstructure of the ship.

Further, the image processing apparatus 1 is configured so that the classifier unit 15 classifies each ship chip into one of classes based on the learnt features of ship chips. As a result, the image processing apparatus 1 can improve the accuracy of the classification of ships. That is, the image processing apparatus 1 according to the first embodiment can provide an image processing apparatus capable of appropriately distinguishing various ship types.

Further, the feature learner unit 14 has another advantageous effect that it can automatically learn 2D features of ships.

Second Embodiment

Figure 8:
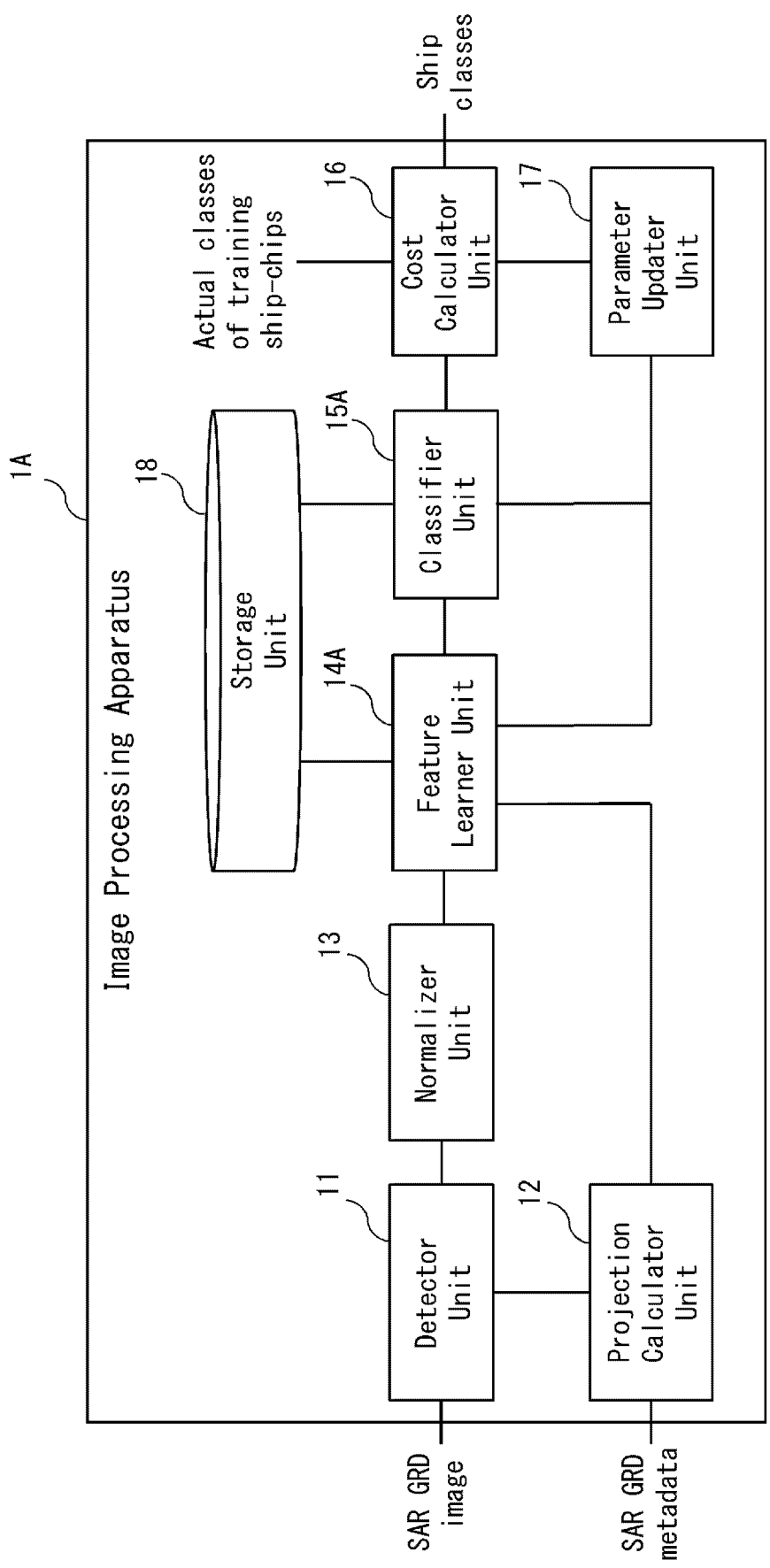
FIG. 8 is a block diagram showing a configuration example of an image processing apparatus according to a second embodiment.

Next, a configuration example of an image processing apparatus 1A according to a second embodiment of the present disclosure is explained with reference to a block diagram shown in FIG. 8. The image processing apparatus 1A according to the second embodiment includes a detector unit 11, a projection calculator unit 12, a normalizer unit 13, a feature learner unit 14A, a classifier unit 15A, a cost calculator unit 16, a parameter updater unit 17, and a storage unit 18. Note that configurations of the detector unit 11, the projection calculator unit 12, and the normalizer unit 13 of the image processing apparatus 1A are similar to those of the image processing apparatus 1 according to the first embodiment, and therefore their explanations are omitted.

The feature learner unit 14A and the classifier unit 15A operate in two modes, i.e., a training mode and an actual operational mode. Further, the cost calculator unit 16 and the parameter updater unit 17 operate in the training mode.

Firstly, the training mode is explained. In the training mode, the feature learner unit 14A receives a 2D vector [θ,σ] for each training ship from the projection calculator unit 12. Note that the training ship means a target ship in the training mode. Further, the feature learner unit 14A receives a plurality of normalized training ship chips from the normalizer unit 13. Further, the feature learner unit 14A learns, for each training ship, a relation between a normalized training ship chip and a 2D vector [θ,σ] of the training ship, and thereby generates learnt features (Z_train) of training ship chips. Then, the feature learner unit 14A outputs the learnt features (Z_train) of training ship chips to the classifier unit 15A.

In the training mode, the classifier unit 15A receives the learnt features (Z_train) of training ship chips from the feature learner unit 14A. Further, the classifier unit 15A estimates classes of training ship chips based on the learnt features (Z_train) of training ship chips. Then, the classifier unit 15A outputs the estimated classes of training ship chips to the cost calculator unit 16.

The cost calculator unit 16 receives the estimated classes of training ship chips from the classifier unit 15A. Further, actual classes for training ship chips are input to the cost calculator unit 16. Further, the cost calculator unit 16 calculates a cost between the estimated classes of training ship chips and the actual classes of that training ship chips as a misclassification error therebetween. Then, the cost calculator unit 16 outputs the calculated cost to the parameter updater unit 17.

The parameter updater unit 17 receives the cost from the cost calculator unit 16. Further, the parameter updater unit 17 updates feature leaner parameters of the feature learner unit 14A and classifier parameters of the classifier unit 15A so that the cost is minimized. Note that the minimization of the cost can be performed by using an ordinary optimization algorithm such as gradient descent. The minimization of the cost is continued (or repeated) until the cost converges to a state in which the cost function cannot be reduced any longer. Note that updated feature leaner parameters that are obtained after the minimization of the cost are also called "trained feature leaner parameters". Further, updated classifier parameters that are obtained after the minimization of the cost are also called "trained classifier parameters". After performing the minimization of the cost, the parameter updater unit 17 stores the trained feature leaner parameters and the trained classifier parameters into the storage unit 18.

Next, the actual operational mode is explained. In the actual operational mode, the feature learner unit 14A receives a 2D vector [θ,σ] for each newly-detected ship chip from the projection calculator unit 12. Further, the feature learner unit 14A receives a normalized ship chip for each newly-detected ship from the normalizer unit 13. Further, the feature learner unit 14A reads trained feature leaner parameters from the storage unit 18. Further, the feature learner unit 14A uses each normalized ship chip and its 2D vector [θ,σ] as input values and generates learnt features (Z) of each newly-detected ship chip by using the trained feature leaner parameters. Then the feature learner unit 14A outputs the learnt features (Z) of each newly-detected ship chip to the classifier unit 15A.

In the actual operational mode, the classifier unit 15A receives the learnt features (Z) of each newly-detected ship chip from the feature learner unit 14A. Further, the classifier unit 15A reads trained classifier parameters from the storage unit 18. Further, the classifier unit 15A uses learnt features (Z) of each ship as input values and classifies each newly-detected ship chip into one of classes by using the trained classifier parameters. Then the classifier unit 15A outputs the classes into which the newly-detected ship chips have been classified. Note that the classes output from the classifier unit 15A are classes of ships present in the SAR GRD image input to the detector unit 11 in the actual operational mode.

Figure 9:
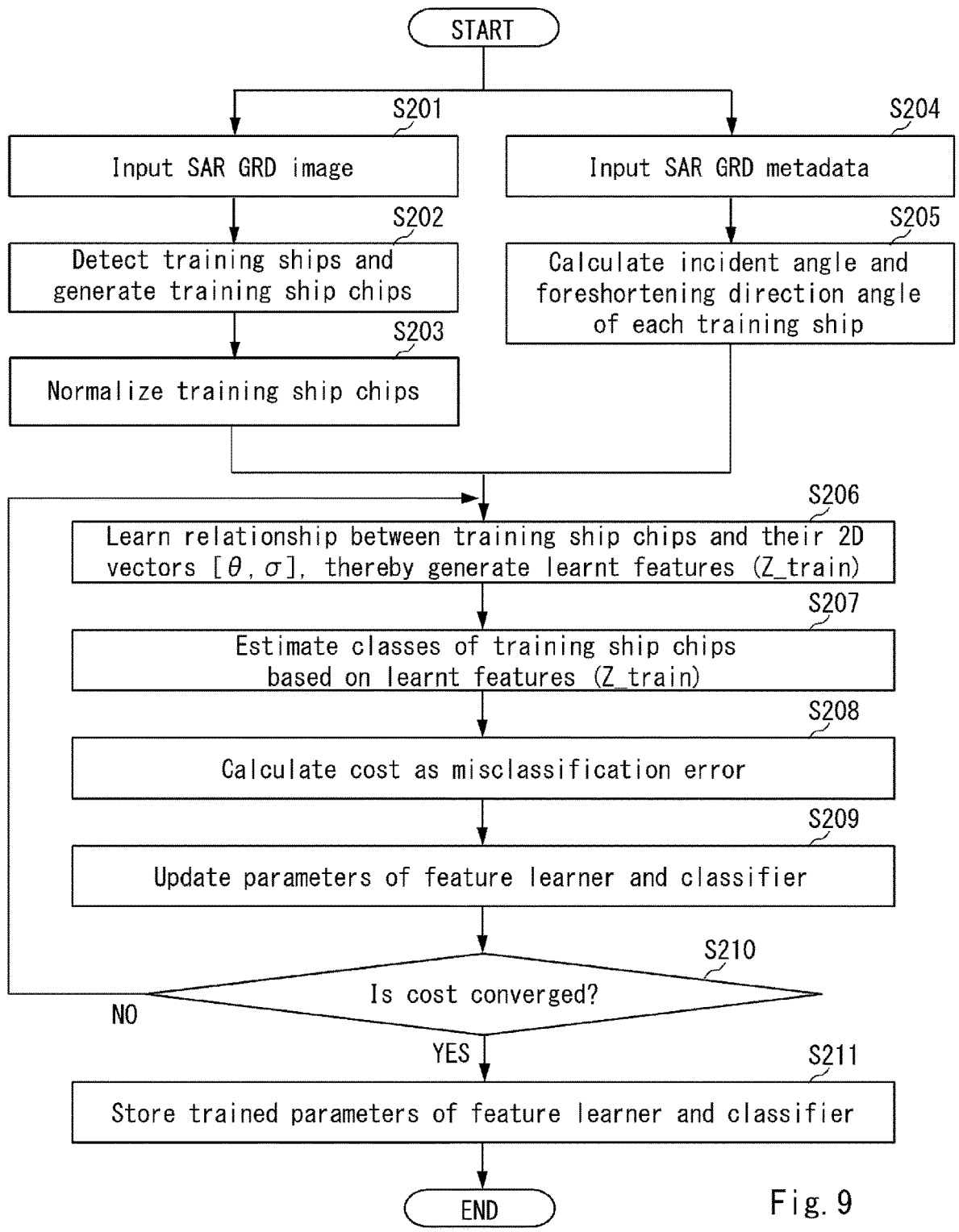
FIG. 9 is a flowchart showing an example of an operation performed by the image processing apparatus according to the second embodiment in a training mode.

Next, an example of an operation performed by the image processing apparatus 1A according to the second embodiment in the training mode is explained with reference to a flowchart shown in FIG. 9.

Firstly, in the image processing apparatus 1A, a SAR GRD image for training ships is input to the detector unit 11 (step S201).

Next, the image processing apparatus 1A detects training ships in the input SAR GRD image and generates training ship chips thereof by using the detector unit 11 (step S202).

Next, the image processing apparatus 1A normalizes pixel values of each training ship chip by using the normalizer unit 13 (step S203).

In parallel to the processes in the steps S201 to S203, processes in steps S204 and S205 are performed. Note that the process in the step S205 is a process that is performed by using training ship chips generated in the step S202 and hence performed after the step S202.

SAR GRD metadata for each training ship is input to the projection calculator unit 12 (step S204). Next, the image processing apparatus 1A calculates, by using the projection calculator unit 12, incident angle (θ) and foreshortening direction angle (σ) for each training ship by using the SAR GRD metadata (step S205).

After the steps S203 and S205, by using the feature learner unit 14A, the image processing apparatus 1A learns, for each training ship, a relation between a normalized training ship chip and a 2D vector [θ,σ] of the training ship, and thereby generates learnt features (Z_train) of training ship chips (step S206).

Next, the image processing apparatus 1A estimates classes of training ship chips based on the learnt features (Z_train) of training ship chips by using the classifier unit 15A (step S207).

Next, the image processing apparatus 1A calculates a cost between the estimated classes of training ship chips and the actual classes of the training ship chips as a misclassification error therebetween by using the cost calculator unit 16 (step S208).

Next, the image processing apparatus 1A updates, by using the parameter updater unit 17, feature leaner parameters of the feature learner unit 14A and classifier parameters of the classifier unit 15A so that the cost is minimized (step S209).

Next, the image processing apparatus 1A determines whether or not the cost has converged by using the parameter updater unit 17 (step S210).

When the image processing apparatus 1A determines that the cost has not converged yet (NO at step S210), the image processing apparatus 1A returns to the step S206. Then, the image processing apparatus 1A performs the processes in the steps S206 to S210 again. On the other hand, when the image processing apparatus 1A determines that the cost has converged (YES at step S210), the image processing apparatus 1A stores the trained feature leaner parameters and the trained classifier parameters into the storage unit 18 (step S211).

Figure 10:
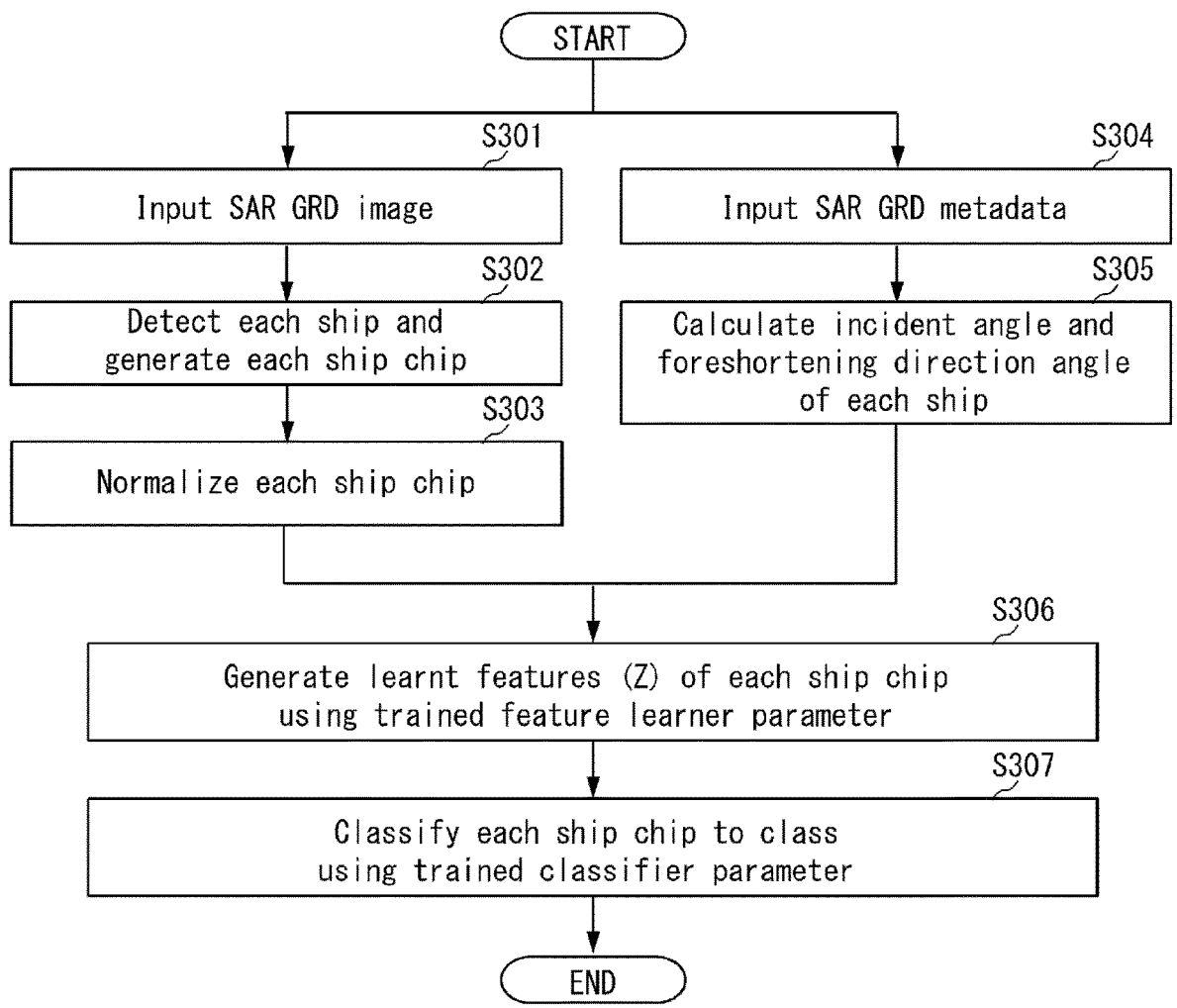
FIG. 10 is a flowchart showing an example of an operation performed by the image processing apparatus according to the second embodiment in an actual operational mode.

Next, an example of an operation performed by the image processing apparatus 1A according to the second embodiment in the actual operational mode is explained with reference to a flowchart shown in FIG. 10.

Firstly, in the image processing apparatus 1A, a SAR GRD image for each newly-detected ship is input to the detector unit 11 (step S301).

Next, the image processing apparatus 1A detects each ship in the input SAR GRD image and generates each ship chip by using the detector unit 11 (step S302).

Next, the image processing apparatus 1A normalizes pixel values of each ship chip by using the normalizer unit 13 (step S303).

In parallel to the processes in the steps S301 to S303, processes in steps S304 and S305 are performed. Note that the process in the step S305 is a process that is performed by using each ship chip generated in the step S302 and hence performed after the step S302.

SAR GRD metadata for each newly-detected ship is input to the projection calculator unit 12 (step S304). Next, the image processing apparatus 1A calculates, by using the projection calculator unit 12, incident angle (θ) and foreshortening direction angle (σ) for each ship by using the SAR GRD metadata (step S305).

After the steps S303 and S305, by using the feature learner unit 14A, the image processing apparatus 1A uses each normalized ship chip and its 2D vector [θ,σ] as input values and generates learnt features (Z) of each ship by using trained feature leaner parameters (step S306).

Next, by using the classifier unit 15A, the image processing apparatus 1A uses the learnt features (Z) of each ship as input values and classifies each ship chip into one of classes by using trained classifier parameters (step S307).

As described above, the image processing apparatus 1A according to the second embodiment is configured so that the feature learner unit 14A learns, for each training ship, a relation between a normalized training ship chip and a 2D vector [θ,σ] of the training ship, and thereby generates learnt features (Z_train) of training ship chips in the training mode. Further, the image processing apparatus 1A is configured so that the classifier unit 15A estimates classes of training ship chips based on the learnt features (Z_train) of training ship chips in the training mode. Further, the image processing apparatus 1A is configured so that the cost calculator unit 16 calculates a cost between the estimated classes of training ship chips and the actual classes of training ship chips as a misclassification error therebetween. Further, the image processing apparatus 1A is configured so that the parameter updater unit 17 updates feature leaner parameters and classifier parameters so that the cost is minimized. In this way, in the image processing apparatus 1A, each normalized ship chip and a 2D vector [θ,σ] of the ship are used as input value, and parameters in the feature learner unit 14A and the classifier unit 15A can be trained (i.e., improved) so that the misclassification error, which occurs when each newly-detected ship chip is classified into one of classes, is minimized.

Third Embodiment

Figure 11:
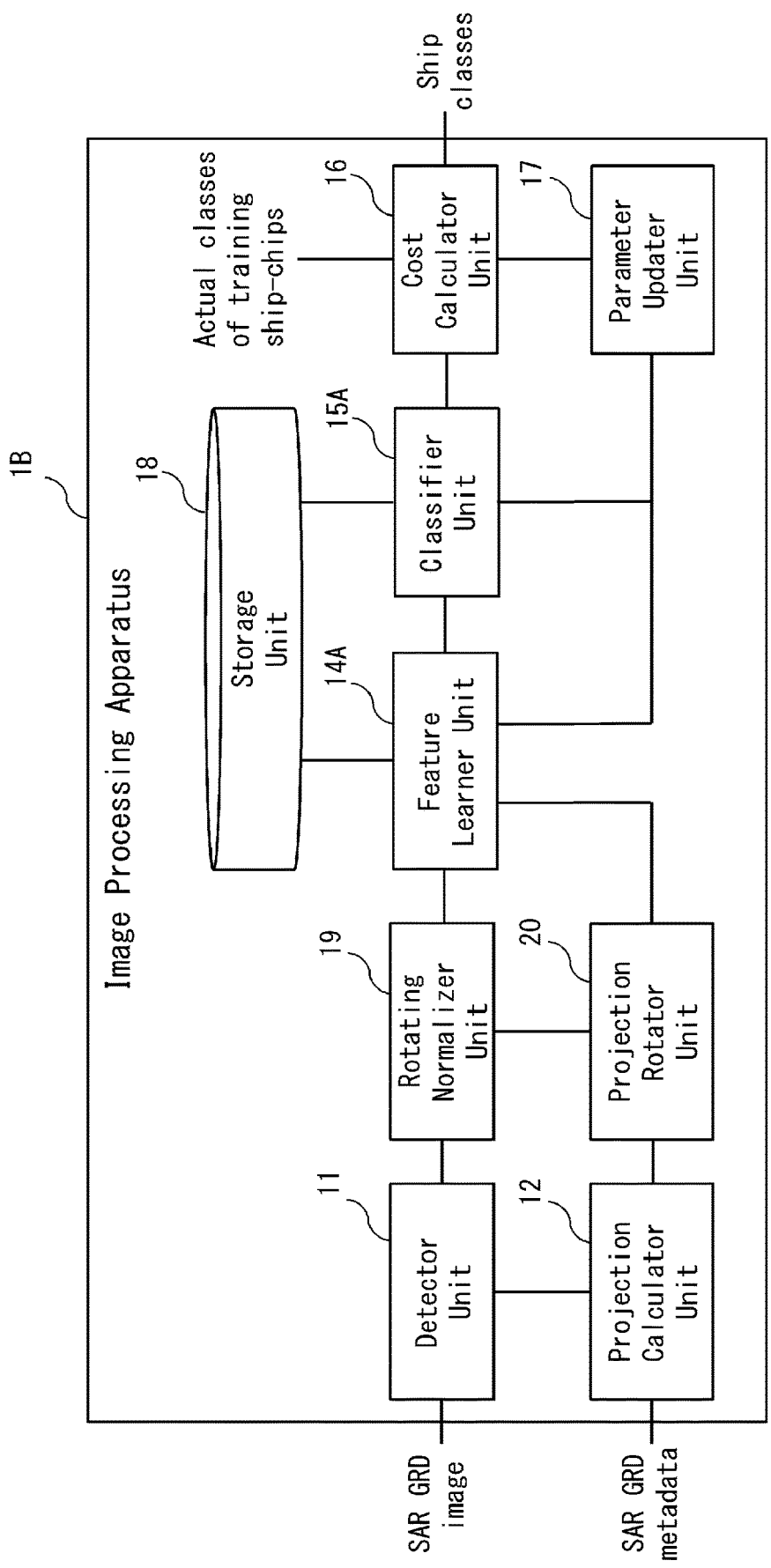
FIG. 11 is a block diagram showing a configuration example of an image processing apparatus according to a third embodiment.

Next, a configuration example of an image processing apparatus 1B according to a third embodiment of the present disclosure is explained with reference to a block diagram shown in FIG. 11. The image processing apparatus 1B according to the third embodiment includes a detector unit 11, a projection calculator unit 12, a feature learner unit 14A, a classifier unit 15A, a cost calculator unit 16, a parameter updater unit 17, a storage unit 18, a rotating normalizer unit 19, and a projection rotator unit 20. That is, compared to the image processing apparatus 1A according to the second embodiment, the image processing apparatus 1B according to the third embodiment includes the rotating normalizer unit 19 in place of the normalizer unit 13 and further includes the projection rotator unit 20. Note that configuration of the image processing apparatus 1B is similar to that of the image processing apparatus 1A according to the second embodiment except for the configuration of the rotating normalizer unit 19 and the projection rotator unit 20, and therefore the explanation of the similar part is omitted.

In the above explanation, an incident angle (θ) from a SAR satellite is explained as a factor that affects the appearance of an object in an SAR geometry in the earth geographic coordinate system. Another factor that affects the appearance of an object in the SAR geometry in the earth geographic coordinate system is an orientation angle φ'. For example, when a ship shown in FIG. 2 is tuned by an example orientation angle, e.g., by (φ'+180) degrees, the stern of the ship is detected before the bow thereof is detected. Therefore, the ship appears in the SAR image in a different appearance (i.e., in a different shape). This factor could apply to other ship components such as a superstructure thereof. Therefore, both of the incident angle θ and orientation angle φ' affect the projection of the 3D superstructure of the ship in the SAR geometry. That is, a change in the orientation angle φ' changes the projection of the ship in the SAR image.

Rotating normalizer unit 19 normalizes each ship chip's pixel values by their mean to make all the pixel values in the range between 0 and 1. The said function is optional if the pixel values of the ship chips are pre-normalized in the range between 0 to 1. Further, the rotating normalizer unit 19 determines the orientation angle φ' of each ship chip. Note that for the determination of the orientation angle φ' of each ship chip, algorithms such as a Principal Component Analysis and a Radon Transform may be used. Further, the rotating normalizer unit 19 rotates each normalized ship chip by the determined orientation angle φ' and thereby aligns all the normalized ship chips so that they point in the east direction. Note that the east is shown in FIG. 2. Then, the rotating normalizer unit 19 outputs information of each of the normalized ship chips pointed in the east direction to the feature learner unit 14A. Further, the rotating normalizer unit 19 outputs the orientation angle φ' of each ship chip to the projection rotator unit 20.

As described above, all the normalized ship chips are aligned by the rotating normalizer unit 19 so that they point in the east direction. As a result of rotation of each ship, their corresponding foreshortening direction angles will also change. The projection rotator unit 20 performs a process in which an effect of the orientation of each ship on its projection is taken into account.

The projection rotator unit 20 receives a 2D vector [θ,σ] for the central pixel of each ship from the projection calculator unit 12. Further, the projection rotator unit 20 receives the orientation angle φ' of each ship chip from the rotating normalizer unit 19. Further, the projection rotator unit 20 generates a new 2D vector [θ,σ'] of each ship by rotating the 2D vector [θ,σ] for the central pixel of that ship by the corresponding orientation angle φ' of that ship. Note that the foreshortening direction angle σ' is an angle obtained by subtracting the orientation angle φ' from the foreshortening direction angle σ. Further, the projection rotator unit 20 outputs the new 2D vector [θ,σ'] of each ship to the feature learner unit 14A.

Figure 12:
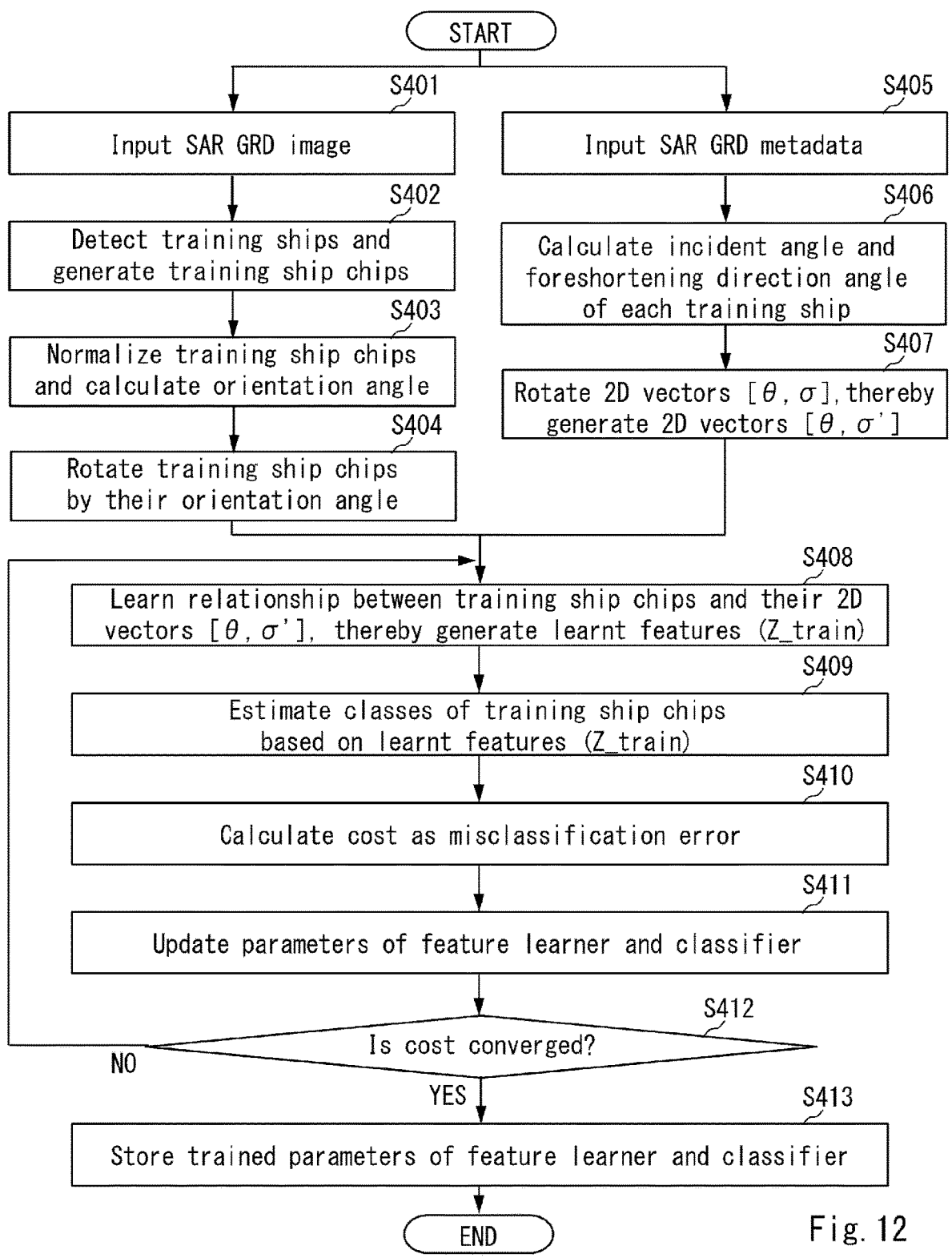
FIG. 12 is a flowchart showing an example of an operation performed by the image processing apparatus according to the third embodiment in a training mode.

Next, an example of an operation performed by the image processing apparatus 1B according to the third embodiment in the training mode is explained with reference to a flowchart shown in FIG. 12. Note that steps S401, S402, S405, S406, and S409-S413 in FIG. 12 are similar to the steps S201, S202, S204, S205 and S207-S211 in FIG. 9, and therefore their explanations are omitted. Note that the steps S405 to S407 are performed in parallel with the steps S401 to S404. However, the step S406 is performed by using training ship chips generated in the step S402 and hence performed after the step S402. Further, the step S407 is performed by using the orientation angle φ' of each training ship chip determined in the step S403 and hence performed after the step S403.

By using the rotating normalizer unit 19, the image processing apparatus 1B normalizes each training ship chip's pixel values and determines the orientation angle φ' of each training ship chip (step S403).

Next, the image processing apparatus 1B rotates, by using the rotating normalizer unit 19, each normalized training ship chip by the corresponding orientation angle φ' (step S404).

By using the projection rotator unit 20, the image processing apparatus 1B rotates a 2D vector [θ,σ] of each training ship by the corresponding orientation angle φ' of the training ship chip and thereby generates a new 2D vector [θ,σ'] of each training ship (step S407).

After the steps S404 and S407, by using the feature learner unit 14A, the image processing apparatus 1B learns, for each training ship, a relation between a normalized and rotated training ship chip and a 2D vector [θ,σ'] of the training ship, and thereby generates learnt features (Z_train) of training ship chips (step S408).

Figure 13:
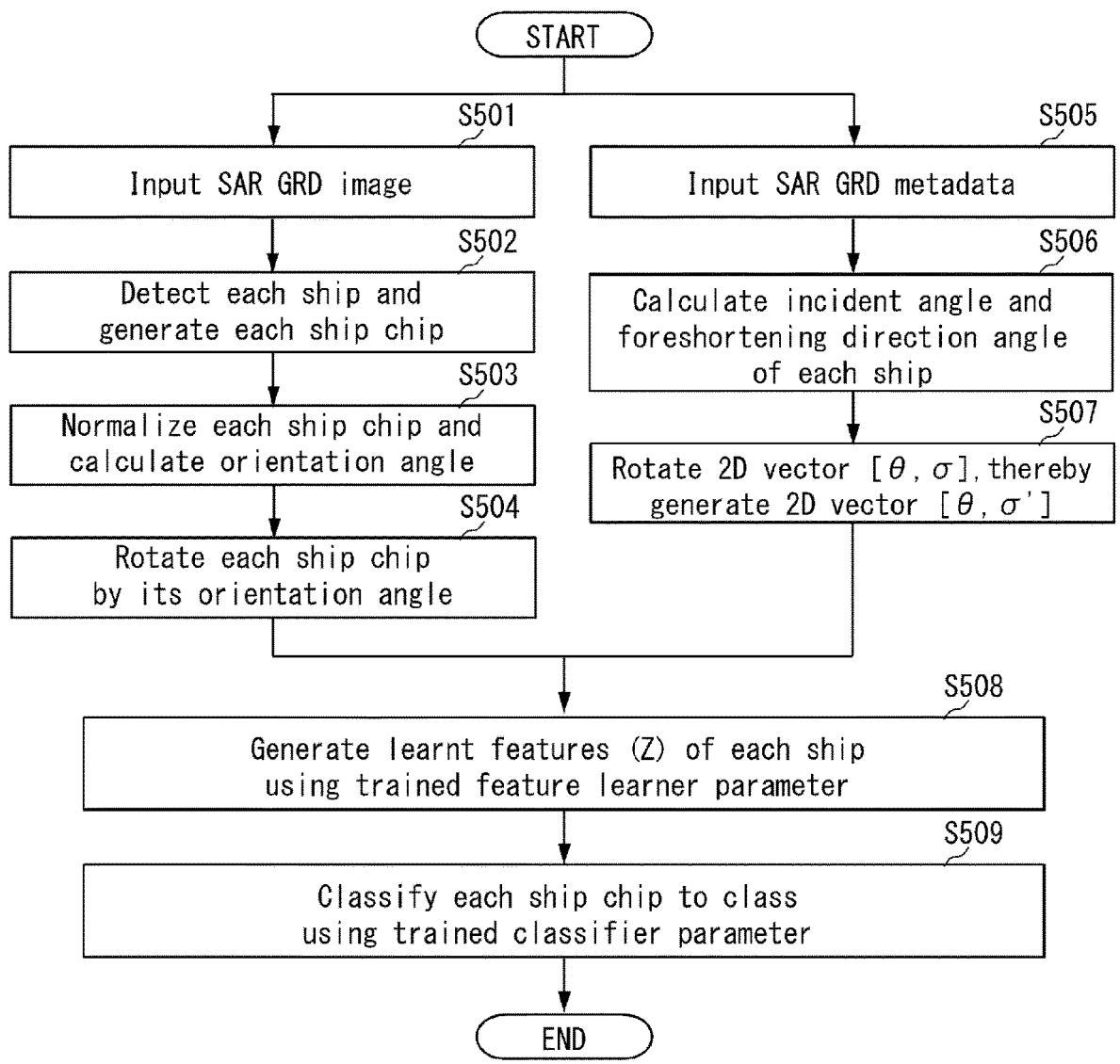
FIG. 13 is a flowchart showing an example of an operation performed by the image processing apparatus according to the third embodiment in an actual operational mode.

Next, an example of an operation performed by the image processing apparatus 1B according to the third embodiment in the actual operational mode is explained with reference to a flowchart shown in FIG. 13. Note that steps S501, S502, S505, S506, and S509 in FIG. 13 are similar to the steps S301, S302, S304, S305 and S307 in FIG. 10, and therefore their explanations are omitted. Note that the steps S505 to S507 are performed in parallel with the steps S501 to S504. However, the step S506 is performed by using each ship chip generated in the step S502 and hence performed after the step S502. Further, the step S507 is performed by using the orientation angle φ' of each ship chip determined in the step S503 and hence performed after the step S503.

By using the rotating normalizer unit 19, the image processing apparatus 1B normalizes each ship chip's pixel values and determines the orientation angle φ' of each ship chip (step S503).

Next, the image processing apparatus 1B rotates, by using the rotating normalizer unit 19, each normalized ship chip by the corresponding orientation angle φ' (step S504).

By using the projection rotator unit 20, the image processing apparatus 1B rotates a 2D vector [θ,σ] of each ship by the corresponding orientation angle φ' of the ship chip and thereby generates a new 2D vector [θ,σ'] of each ship (step S507).

After the steps S504 and S507, by using the feature learner unit 14A, the image processing apparatus 1B uses each normalized ship chip and its 2D vector [θ,σ'] as input values and generates learnt features (Z) of each ship by using trained feature leaner parameters (step S508).

As described above, the image processing apparatus 1B according to the third embodiment of the present disclosure is configured to, by using the rotating normalizer unit 19, normalize each ship chip's pixel values and determine the orientation angle φ' of each ship chip. Further, the image processing apparatus 1B is configured to, by using the rotating normalizer unit 19, rotates each normalized ship chip by the corresponding orientation angle φ'. In this way, the image processing apparatus 1B can align all the ship chips so that they point in the east direction.

Further, the image processing apparatus 1B is configured to, by using the projection rotator unit 20, rotates a 2D vector [θ,σ] of the central pixel of each ship by the corresponding orientation angle φ' of the ship chip and thereby generates a new 2D vector [θ, σ'] of each ship. In this way, the image processing apparatus 1B can generate a 2D vector [θ, σ'] of each ship while taking not only the incident angle θ from the SAR satellite but also the orientation angle φ' into account as factors that affect the appearance of an object in the SAR geometry in the earth geographic coordinate system. Therefore, compared to the image processing apparatus 1A according to the second embodiment, the image processing apparatus 1B according to the third embodiment can take more information that affect the superstructure of each ship into consideration. Consequently, it is possible to improve the accuracy of the learning process in the feature learner unit 14A. Accordingly, the image processing apparatus 1B can improve the accuracy for classification of ships in the SAR image.

Fourth Embodiment

Although the first embodiment to the third embodiment is described about ship type recognition, the first embodiment to the third embodiment can also be applied to general object recognition. In a fourth embodiment, general object recognition is described.

Figure 14:
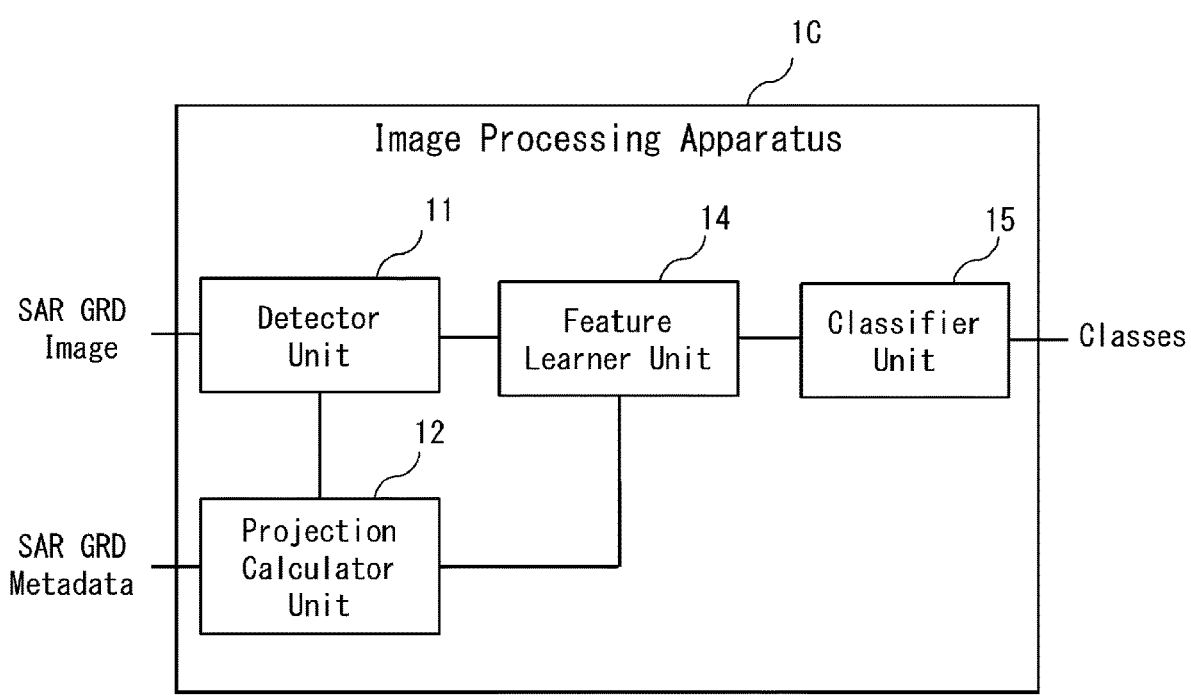
FIG. 14 is a block diagram showing a configuration example of an image processing apparatus according to a fourth embodiment.

A configuration example of an image processing apparatus 1C according to the fourth embodiment of the present disclosure is explained with reference to a block diagram shown in FIG. 14. The image processing apparatus 1C according to the fourth embodiment includes a detector unit 11, a projection calculator unit 12, a feature learner unit 14, and a classifier unit 15.

The detector unit 11 detects object targets present in the SAR GRD image. Further, the detector unit 11 generates object chips. Further, the detector unit 11 outputs each object chip to the projection calculator unit 12 and the feature learner unit 14. Further, the detector unit 11 outputs the geographical coordinates of the central pixel of each object to the projection calculator unit 12.

The projection calculator unit 12 calculates projection information of each object using SAR geometry. Further, the projection calculator unit 12 outputs the projection information of each object to the feature learner unit 14.

The feature learner unit 14 learns for each object, a relation between an object chip and its projection information, and thereby generates learnt features of object chips. Further, the feature learner unit 14 outputs the learnt features of object chips to the classifier unit 15.

The classifier unit 15 classifies object chips into classes based on the learnt features of object chips.

Figure 15:
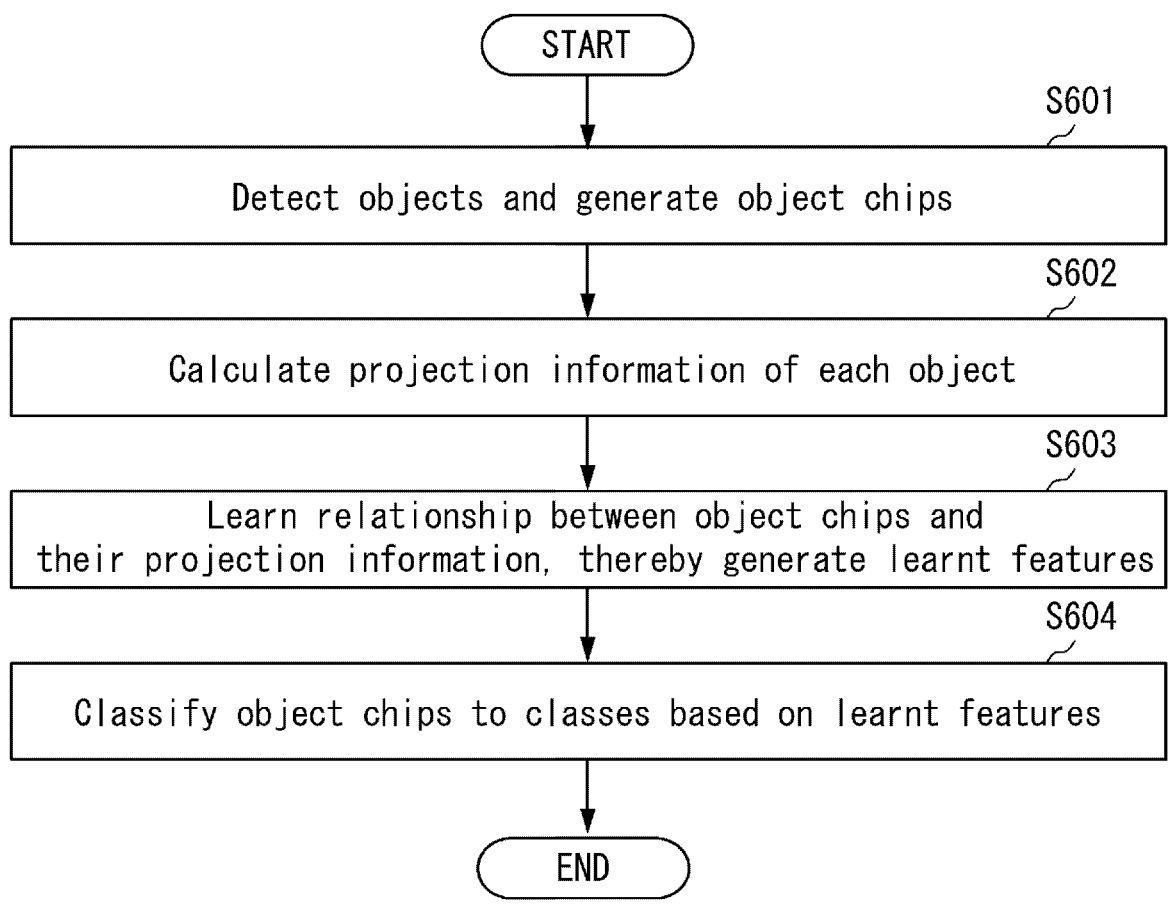
FIG. 15 is a flowchart showing an example of an operation performed by the image processing apparatus according to the fourth embodiment.

Next, an example of an operation performed by the image processing apparatus 1C according to the fourth embodiment is explained with reference to a flowchart shown in FIG. 15.

Firstly, the image processing apparatus 1C detects objects in an input SAR image and generates object chips thereof by using the detector unit 11 (step S601).

Next, the image processing apparatus 1C calculates projection information of each object using SAR geometry by the projection calculator unit 12 (step S602).

Next, the image processing apparatus 1C learns, for each object, a relation between an object chip and its projection information, and thereby generates learnt features of object chips by using the feature learner unit 14 (step S603).

Next, the image processing apparatus 1C classifies each object chip into one of classes based on the learnt features of object chips by using the classifier unit 15 (step S604).

As described above, the image processing apparatus 1C according to the fourth embodiment of the present disclosure is configured so that the projection calculator unit 12 calculates projection information of each object using SAR geometry. Therefore, in the image processing apparatus 1C, partial 3D information can be extracted from an SAR geometry in a form of projection.

Further, the image processing apparatus 1C is configured so that the feature learner unit 14 learns, for each object, a relation between an object chip and its projection information, and thereby generates learnt features of object chips. In this way, in the image processing apparatus 1C, it is possible to learn a relation between projection information (i.e., partial 3D information) and its corresponding object image, and thereby to extract 3D structural information about the superstructure of the object.

Further, the image processing apparatus 1C is configured so that the classifier unit 15 classifies each object chip into one of classes based on the learnt features of object chips. As a result, the image processing apparatus 1C can improve the accuracy of the classification of objects. That is, the image processing apparatus 1C according to the fourth embodiment can provide an image processing apparatus capable of appropriately distinguishing various objects.

Further, although the present disclosure is described as a hardware configuration in the above-described embodiments, the present disclosure is not limited to the hardware configurations. The present disclosure can be implemented by having a processor such as a CPU (Central Processing Unit) included in the image processing apparatus to execute a computer program for performing each process in each of the above-described functions.

In the above-described examples, the program can be stored in various types of non-transitory computer readable media and thereby supplied to computers. The non-transitory computer readable media includes various types of tangible storage media. Examples of the non-transitory computer readable media include a magnetic recording medium (such as a flexible disk, a magnetic tape, and a hard disk drive), a magneto-optic recording medium (such as a magneto-optic disk), a CD-ROM (Read Only Memory), a CD-R, and a CD-R/W, a DVD (Digital Versatile Disc), a BD (Blu-ray (registered trademark) Disc), and a semiconductor memory (such as a mask ROM, a PROM (Programmable ROM), an EPROM (Erasable PROM), a flash ROM, and a RAM (Random Access Memory)). Further, the program can be supplied to computers by using various types of transitory computer readable media. Examples of the transitory computer readable media include an electrical signal, an optical signal, and an electromagnetic wave. The transitory computer readable media can be used to supply programs to computer through a wire communication path such as an electrical wire and an optical fiber, or wireless communication path.

Although the present disclosure is explained above with reference to embodiments, the present disclosure is not limited to the above-described embodiments. Various modifications that can be understood by those skilled in the art can be made to the configuration and details of the present disclosure within the scope of the invention.

The whole or part of the embodiments disclosed above can be described as, but not limited to, the following supplementary notes.

(Supplementary Note 1)

An image processing apparatus comprising:

detector means for detecting objects in an input SAR image and generating object chips;

projection calculator means for calculating projection information of each object using SAR geometry;

feature learner means for learning, for each object, a relation between an object chip and its projection information, and thereby generating learnt features of object chips; and classifier means for classifying object chips into classes based on the learnt features of object chips.

(Supplementary Note 2)

The image processing apparatus according to Supplementary note 1, wherein the projection calculator means calculates 3D geometrical information as the projection information of each object, wherein the 3D geometrical information relates to at least one of relationship between a radar transmitter and each object and relationship between a radar receiver and each object.

(Supplementary Note 3)

The image processing apparatus according to Supplementary note 1, wherein the projection calculator means calculates at least one of an incident angle of each object and a foreshortening direction angle of each object as the projection information of each object.

(Supplementary Note 4)

The image processing apparatus according to Supplementary note 1, wherein the projection calculator means calculates a 2D vector [θ,σ] as the projection information of each object, wherein the θ is an incident angle of that object and the σ is a foreshortening direction angle of that object.

(Supplementary Note 5)

The image processing apparatus according to Supplementary note 4, further comprising cost calculator means, parameter updater means, and storage means, wherein the feature learner means learns, for each training object, a relation between a training object chip and a 2D vector $[\theta,\sigma]$ of the training object, and thereby generates learnt features (Z_train) of training object chips in training mode, the classifier means estimates classes of training object chips based on the learnt features (Z_train) of training object chips in the training mode, the cost calculator means calculates a cost between an estimated classes of training object chips and an actual classes of that training object chips as a misclassification error therebetween in the training mode, the parameter updater means updates feature leaner parameters of the feature learner means and classifier parameters of the classifier means so that the cost is minimized, and the parameter updater means stores updated feature leaner parameters and updated classifier parameters into the storage means.

(Supplementary Note 6)

The image processing apparatus according to Supplementary note 5, wherein the feature learner means uses an object chip for each newly-detected object and its 2D vector $[\theta,\sigma]$ as input values and generates learnt features (Z) of each newly-detected object chip by using the updated feature leaner parameters in operational mode, and the classifier means uses the learnt features (Z) of newly-detected object chip as input values and classifies each newly-detected object chip into one of classes by using the updated classifier parameters in the operational mode.

(Supplementary Note 7)

The image processing apparatus according to any one of Supplementary notes 1 to 6, further comprising normalizer means for normalizing pixel values of each object chip.

(Supplementary Note 8)

The image processing apparatus according to any one of Supplementary notes 4 to 6, further comprising projection rotator means and rotating normalizer means, wherein the rotating normalizer means normalizes pixel values of each object chip, determines an orientation angle $\varphi'$ of each object chip, and rotates each normalized object chip by its determined orientation angle $\varphi'$, and the projection rotator means rotates a 2D vector $[\theta,\sigma]$ of each object by its orientation angle $\varphi'$ and thereby generates a new 2D vector $[\theta,\sigma']$ of each object, wherein the $\sigma'$ is an angle obtained by subtracting the orientation angle $\varphi'$ from the foreshortening direction angle $\sigma$.

(Supplementary Note 9)

The image processing apparatus according to any one of Supplementary notes 4 to 6 and 8, wherein the projection calculator means calculates a 2D or 3D vector containing other forms and combinations of the incident angle and the foreshortening direction angle such as $[\cot(\theta)\cos(\sigma), \cot(\theta)\sin(\sigma)]$ or $[\cot(\theta), \cos(\sigma), \sin(\sigma)]$ as the projection information of each object.

(Supplementary Note 10)

The image processing apparatus according to any one of Supplementary notes 1 to 9, wherein the detector means is either a Constant False Alarm Rate (CFAR) or adaptive CFAR.

(Supplementary Note 11)

The image processing apparatus according to any one of Supplementary notes 1 to 10, wherein the feature learner means is a type of auto-encoder capable of learning features of objects.

(Supplementary Note 12)

The image processing apparatus according to any one of Supplementary notes 1 to 11, wherein the classifier means is either a Support Vector Machine or a Neural Network.

(Supplementary Note 13)

An image processing method comprising:

detecting objects in an input SAR image and generating object chips;

calculating projection information of each object using SAR geometry;

learning, for each object, a relation between an object chip and its projection information, and thereby generating learnt features of object chips; and classifying object chips into classes based on the learnt features of object chips.

(Supplementary Note 14)

The image processing method according to Supplementary note 13, wherein the projection information of each object is 3D geometrical information, wherein the 3D geometrical information relates to at least one of relationship between a radar transmitter and each object and relationship between a radar receiver and each object.

(Supplementary Note 15)

A non-transitory computer readable medium storing an image processing program is a non-transitory computer readable medium storing an image processing program for causing a computer to execute an image processing method, the image processing method comprising:

detecting objects in an input SAR image and generating object chips;

calculating projection information of each object using SAR geometry;

learning, for each object, a relation between an object chip and its projection information, and thereby generating learnt features of object chips; and classifying object chips into classes based on the learnt features of object chips.

(Supplementary Note 16)

The non-transitory computer readable medium storing the image processing program according to Supplementary note 15, wherein the projection information of each object is 3D geometrical information, wherein the 3D geometrical information relates to at least one of relationship between a radar transmitter and each object and relationship between a radar receiver and each object.

REFERENCE SIGNS LIST 1, 1A, 1B, 1C Image processing apparatus
11 detector unit
12 projection calculator unit
13 normalizer unit
14, 14A feature learner unit
15, 15A classifier unit
16 cost calculator unit
17 parameter updater unit
18 storage unit
19 rotating normalizer unit
20 projection rotator unit

The invention claimed is:

1. An image processing apparatus comprising a memory storing instructions and a processor, wherein the processor executes the instructions to:

detect objects in an input Synthetic Aperture Radar (SAR) image and generate object chips;

calculate projection information of each object using SAR geometry;

feature-learn, for each object, a relation between one of the object chips and the projection information of the object to generate learned features of the object chips; and classify the object chips into classes based on the learned features of the object chips, wherein the processor, in calculating the projection information of each object using the SAR geometry, calculates a 2D or 3D vector as the projection information of the object, wherein the 2D or 3D vector is a combination of an incident angle θ of the object and a foreshortening direction angle σ of the object, wherein the 2D or 3D vector is represented by [cot(θ)cos(σ), cot(θ)sin(σ)] or [cot(θ), cos(σ), sin(σ)].

2. The image processing apparatus according to claim 1, wherein the processor, in calculating the projection information of each object using the SAR geometry, calculates 3D geometrical information as the projection information of the object, wherein the 3D geometrical information relates to at least one of a relationship between a radar transmitter and the object and a relationship between a radar receiver and the object.

3. The image processing apparatus according to claim 1, and storage unit, wherein the processor executes the instructions to further perform cost calculating and parameter updating, wherein the processor, in feature-learning, for each object, the relation between the object and the projection information, learns a relation between a training object chip and a 2D vector [θ,σ] of the training object to generate learned features (Z_train) of the training object chips in a training mode, the processor, in classifying the object objects, estimates classes of the training object chips based on the learned features (Z_train) of the training object chips in the training mode, the processor, in performing the cost calculating, calculates a cost between estimated classes of the training object chips and actual classes of the training object chips as a misclassification error therebetween in the training mode, the processor, in performing the parameter updating, updates feature learner parameters of for feature-learning and classifier parameters of the processing for classifying to minimize a, and the processor, in performing the parameter updating, stores the updated feature learner parameters and the updated classifier parameters.

4. The image processing apparatus according to claim 3, wherein the processor, in feature-learning, for each object, the relation between the object and the projection information, uses one of the object chips for the object and a 2D vector [θ,σ] as input values and generates the learned features (Z) of the one of the object chips by using the updated feature learner parameters in an operational mode, and the processor, in classifying the object chips, uses the learned features (Z) of each object chip as the input values and classifies each object chip into one of the classes by using the updated classifier parameters in the operational mode.

5. The image processing apparatus according to claim 1, wherein the processor executes the instructions to further normalize pixel values of each object chip.

6. The image processing apparatus according to claim 1, wherein the processor executes the instructions to further perform projection rotating and rotation normalizing, wherein the processor, in performing the rotation normalizing, the processor, for each object chip, normalizes pixel values of the object chip, determines an orientation angle φ' of the object chip, and rotates object chip as normalized by using determined orientation angle φ', and the processor, in performing the projection rotating, for each object chip, rotates a 2D vector [θ,σ] of the object chip by the orientation angle φ' to generate a new 2D vector [θ,σ'] of the object chip, wherein σ' is an angle obtained by subtracting the orientation angle σ' from the foreshortening direction angle σ.

7. The image processing apparatus according to claim 1, wherein the processor, in detecting the objects, uses either a Constant False Alarm Rate (CFAR) or an adaptive CFAR.

8. The image processing apparatus according to claim 1, wherein the processor, in feature-learning, uses a type of auto-encoder capable of learning features of the objects.

9. The image processing apparatus according to claim 1, wherein the processor, in classifying, uses either a Support Vector Machine or a Neural Network.

10. An image processing method comprising:

detecting objects in an input Synthetic Aperture Radar (SAR) image and generating object chips;

calculating projection information of each object using SAR geometry;

feature-learning, for each object, a relation between one of the object chips and projection information of object to generate learned features of the object chips; and classifying the object chips into classes based on the learned features of the object chips, wherein the projection information of each object is a 2D or 3D vector, wherein the 2D or 3D vector is combinations of an incident angle θ of the object and a foreshortening direction angle σ of the object, wherein the 2D or 3D vector is represented by [cot(θ)cos(σ), cot(θ)sin(σ)] or [cot(θ), cos(σ), sin(σ)].

11. The image processing method according to claim 10, wherein the projection information of each object is 3D geometrical information, wherein the 3D geometrical information relates to at least one of a relationship between a radar transmitter and the object and a relationship between a radar receiver and the object.

12. A non-transitory computer readable medium storing an image processing program is a non-transitory computer readable medium storing an image processing program for causing a computer to execute an image processing method, the image processing method comprising:

detecting objects in an input Synthetic Aperture Radar (SAR) image and generating object chips;

calculating projection information of each object using SAR geometry;

feature-learning, for each object, a relation between one of the object chips and projection information of object to generate learned features of the object chips; and classifying the object chips into classes based on the learned features of the object chips, wherein the projection information of each object is a 2D or 3D vector, wherein the 2D or 3D vector is combinations of an incident angle θ of the object and a foreshortening direction angle σ of the object, wherein the 2D or 3D vector is represented by [cot(θ)cos(σ), cot(θ)sin(σ)] or [cot(θ), cos(σ), sin(σ)].

13. The non-transitory computer readable medium storing the image processing program according to claim 12, wherein the projection information of each object is 3D geometrical information, wherein the 3D geometrical information relates to at least one of a relationship between a radar transmitter and the object and a relationship between a radar receiver and the object.

* * * * *